Figures 22, 23:
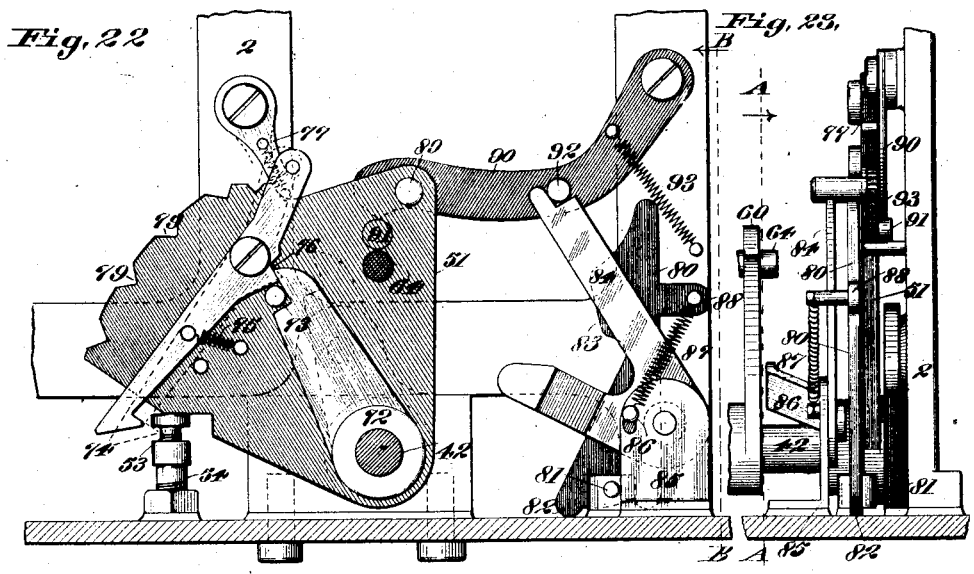

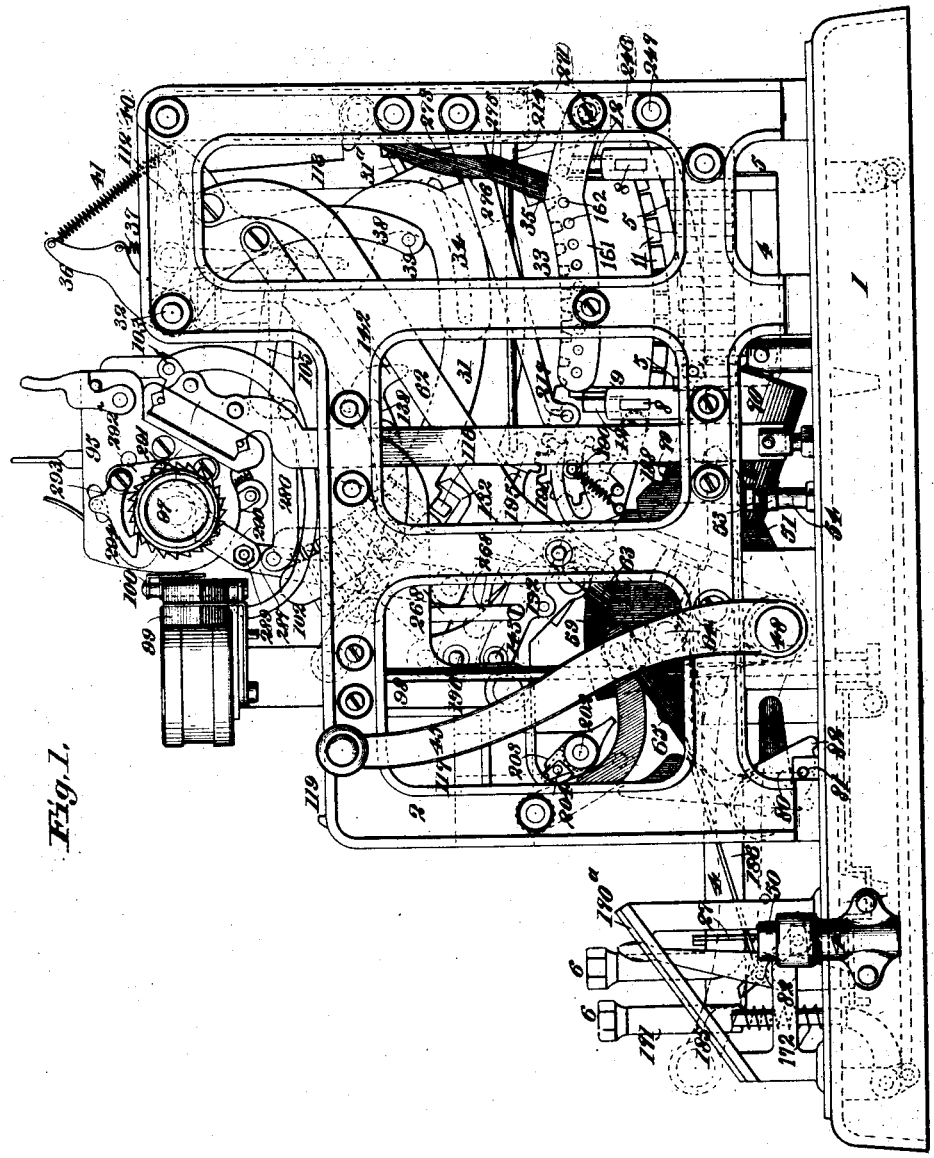

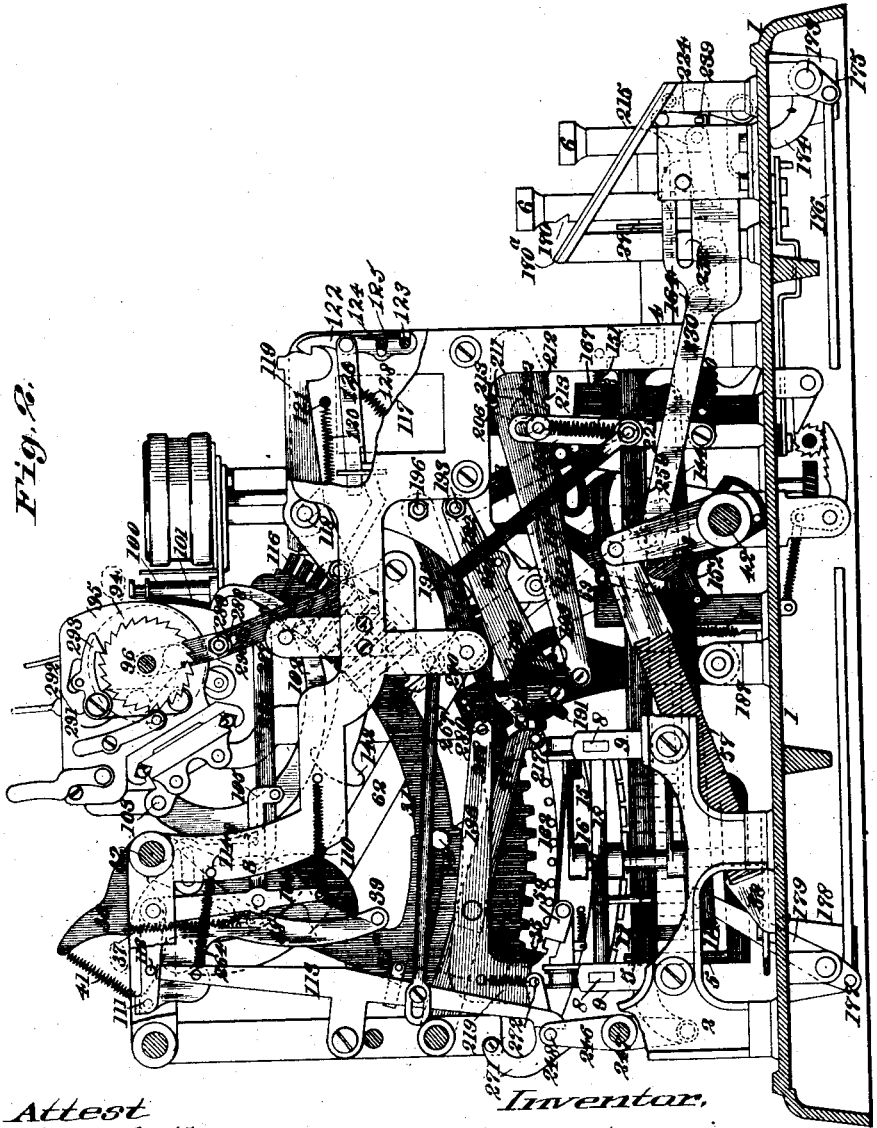

S. G. DORMAN.
ADDING AND RECORDING MACHINE.
APPLICATION FILED OCT. 6, 1906.
1,209,817.
Patented Dec. 26, 1916.
11 SHEETS—SHEET 3.
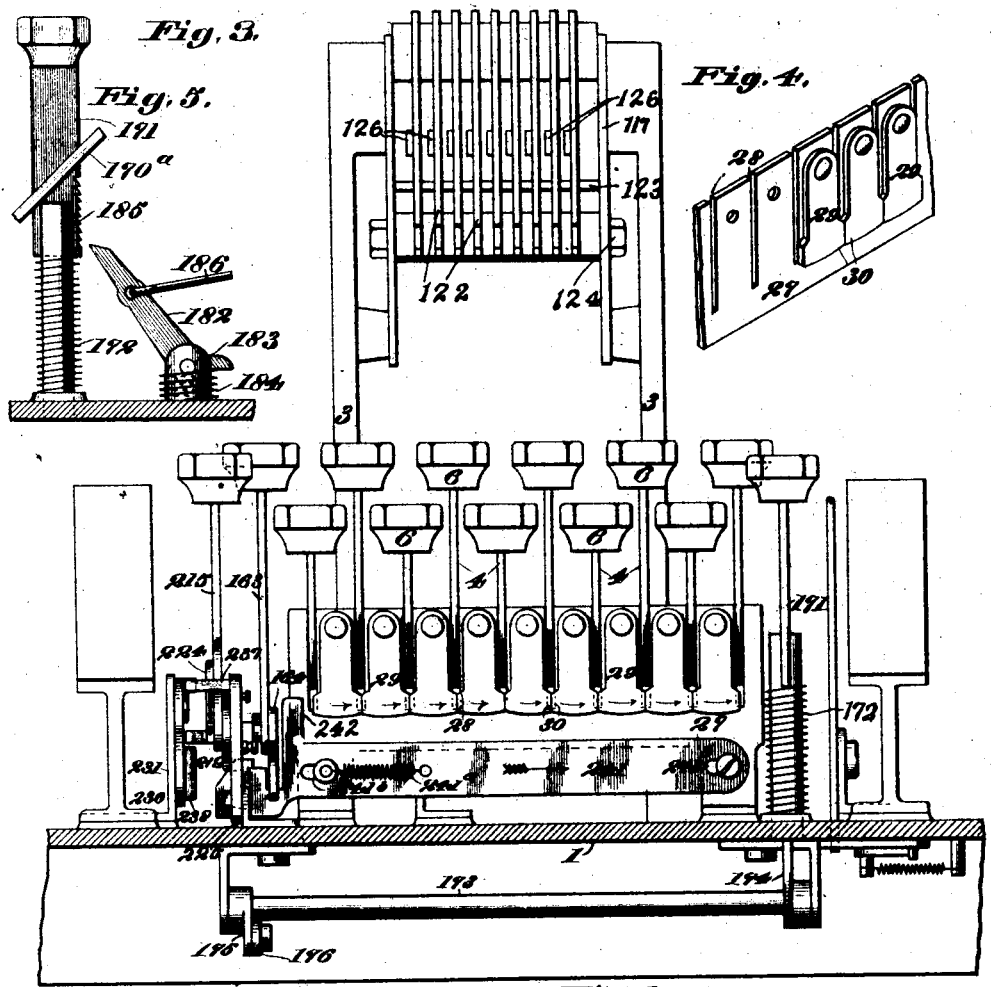
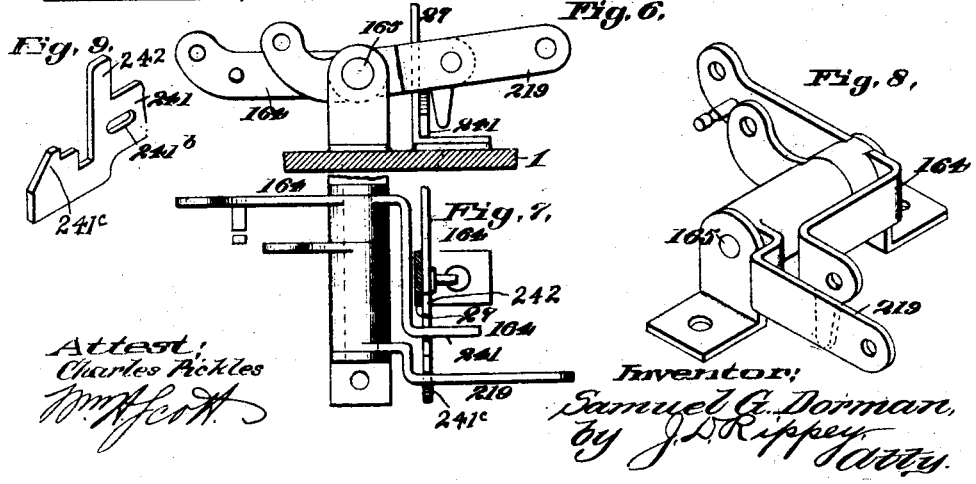
Attest:
Charles Pickles
Inventor:
Samuel G. Dorman,
by J. D. Rippey, Atty.

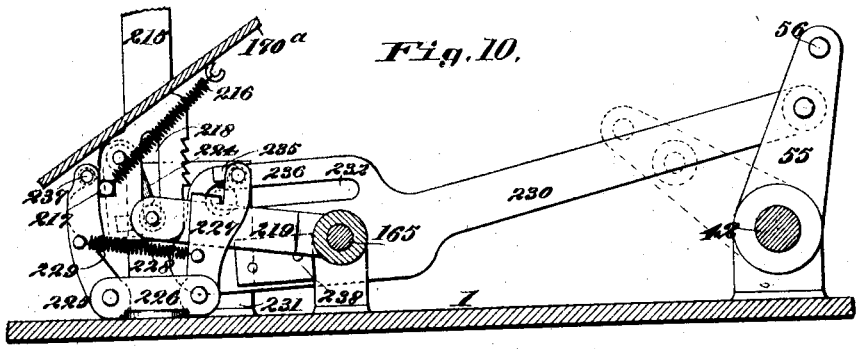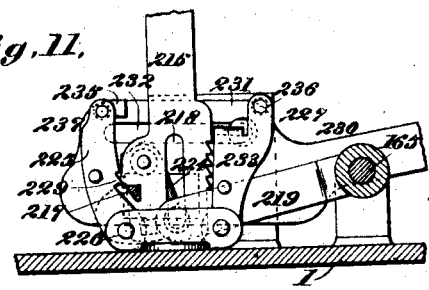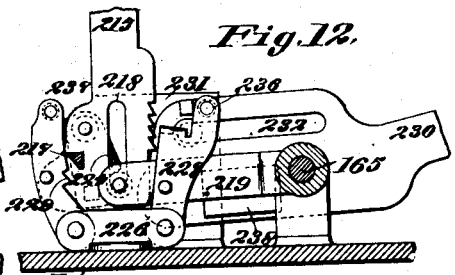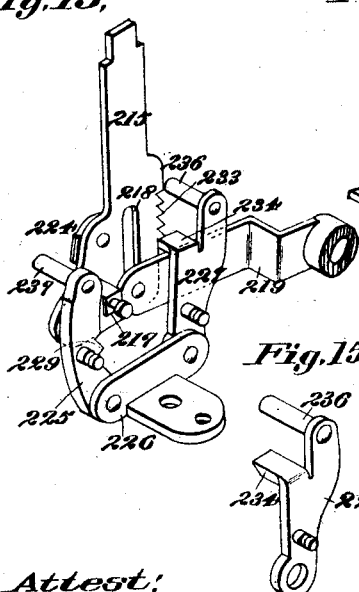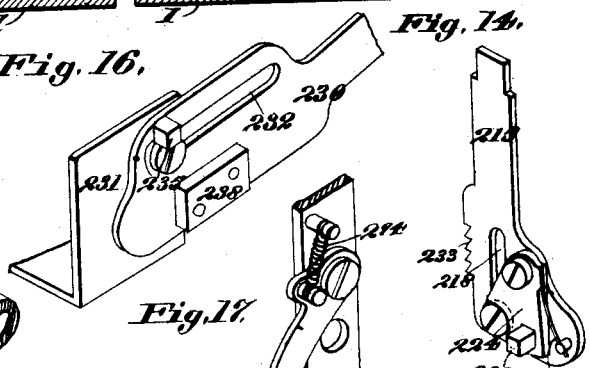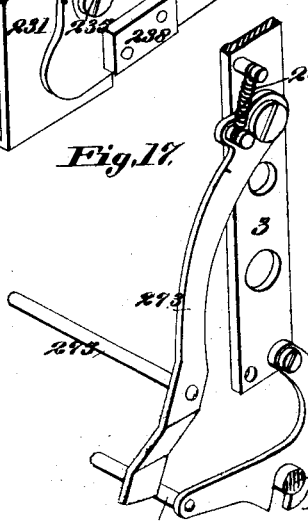

S. G. DORMAN.
ADDING AND RECORDING MACHINE.
APPLICATION FILED OCT. 16, 1906.

1,209,817.

Patented Dec. 26, 1916.
11 SHEETS—SHEET 5.

S. G. DORMAN.
ADDING AND RECORDING MACHINE.
APPLICATION FILED OCT. 16, 1906.

1,209,817.

Patented Dec. 26, 1916.
11 SHEETS—SHEET 6.

Attest:
Charles Pickles

Inventor:
Samuel G. Dorman
by J. D. Rippey
Atty

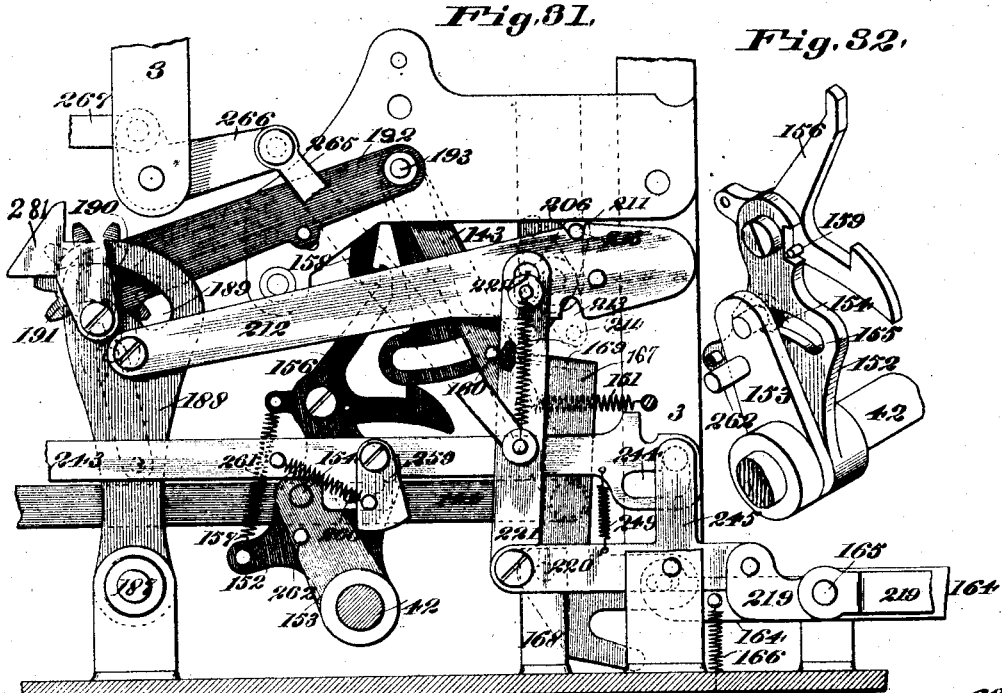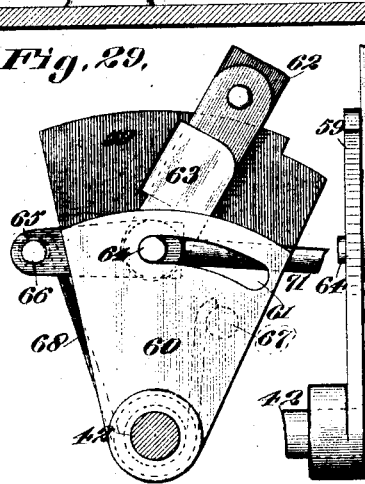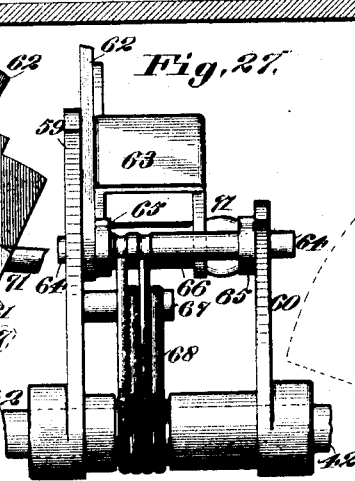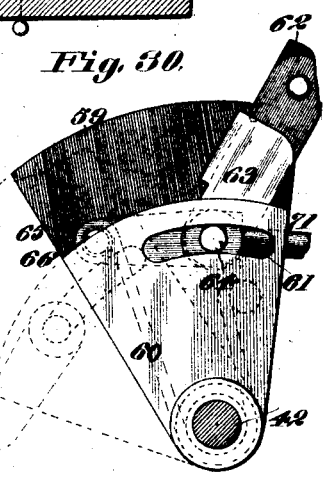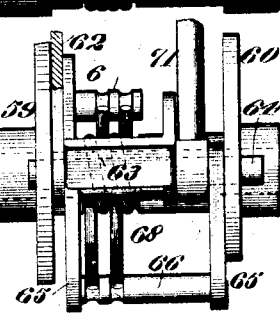

S. G. DORMAN.
ADDING AND RECORDING MACHINE.
APPLICATION FILED OCT. 16, 1906.

1,209,817.

Patented Dec. 26, 1916.
11 SHEETS—SHEET 8.

Attest:
Charles Pickles

Inventor:
Samuel G. Dorman,
by J. D. Rippey
Atty

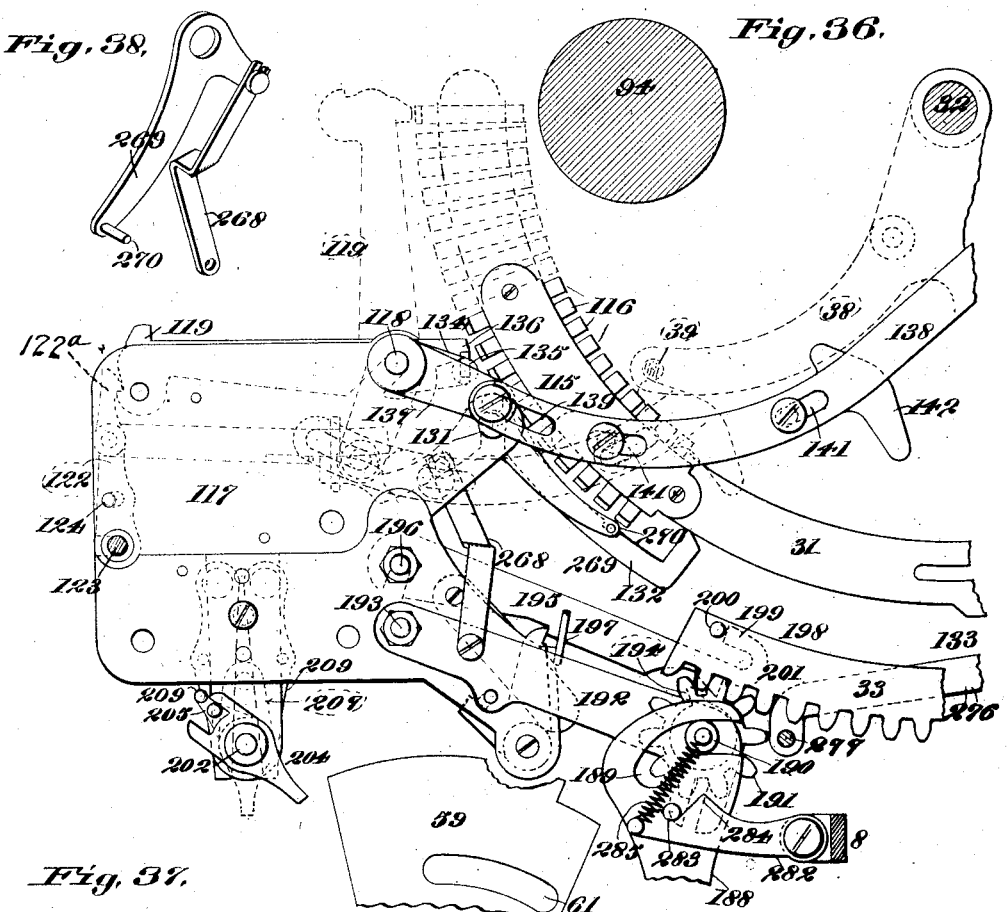

S. G. DORMAN.
ADDING AND RECORDING MACHINE.
APPLICATION FILED OCT. 16, 1906.
1,209,817.
Patented Dec. 26, 1916.
11 SHEETS—SHEET 10.
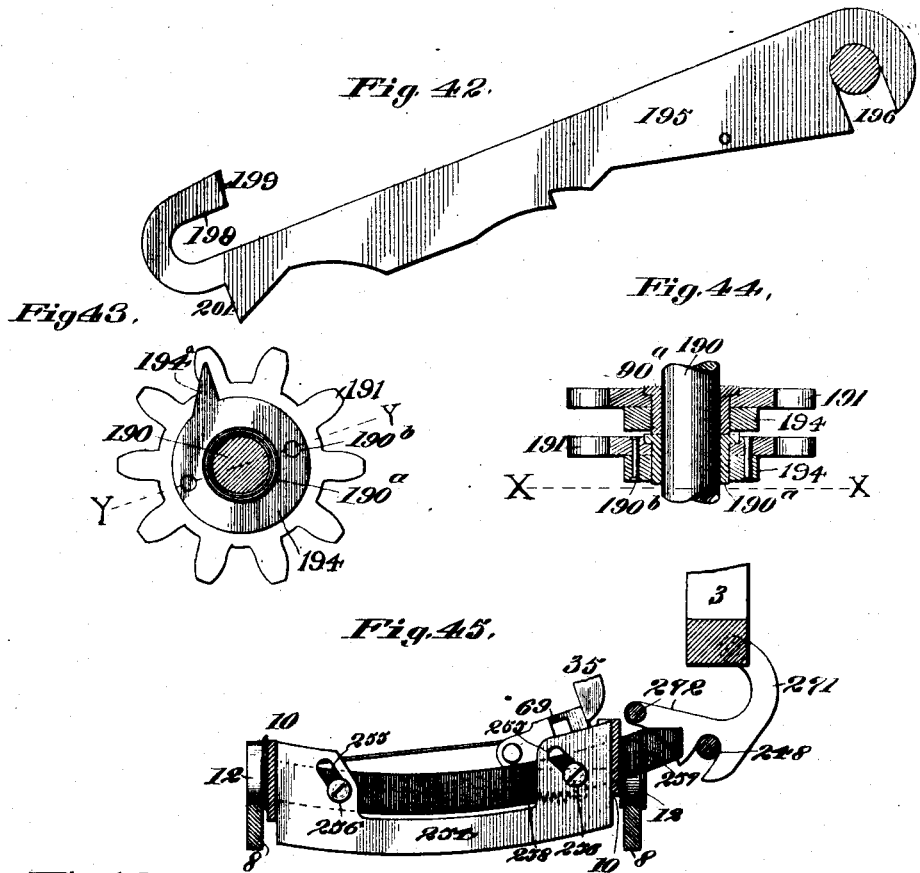
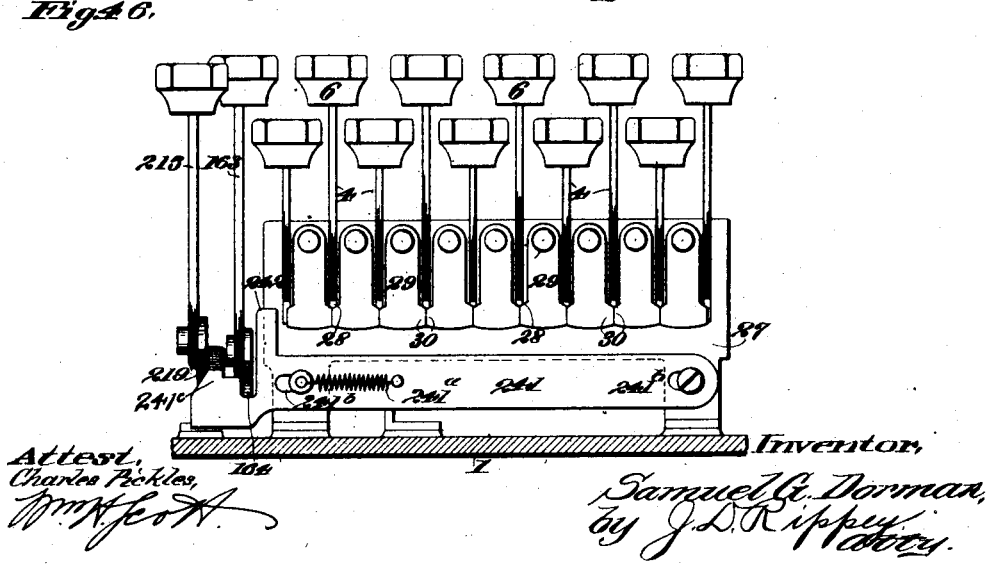

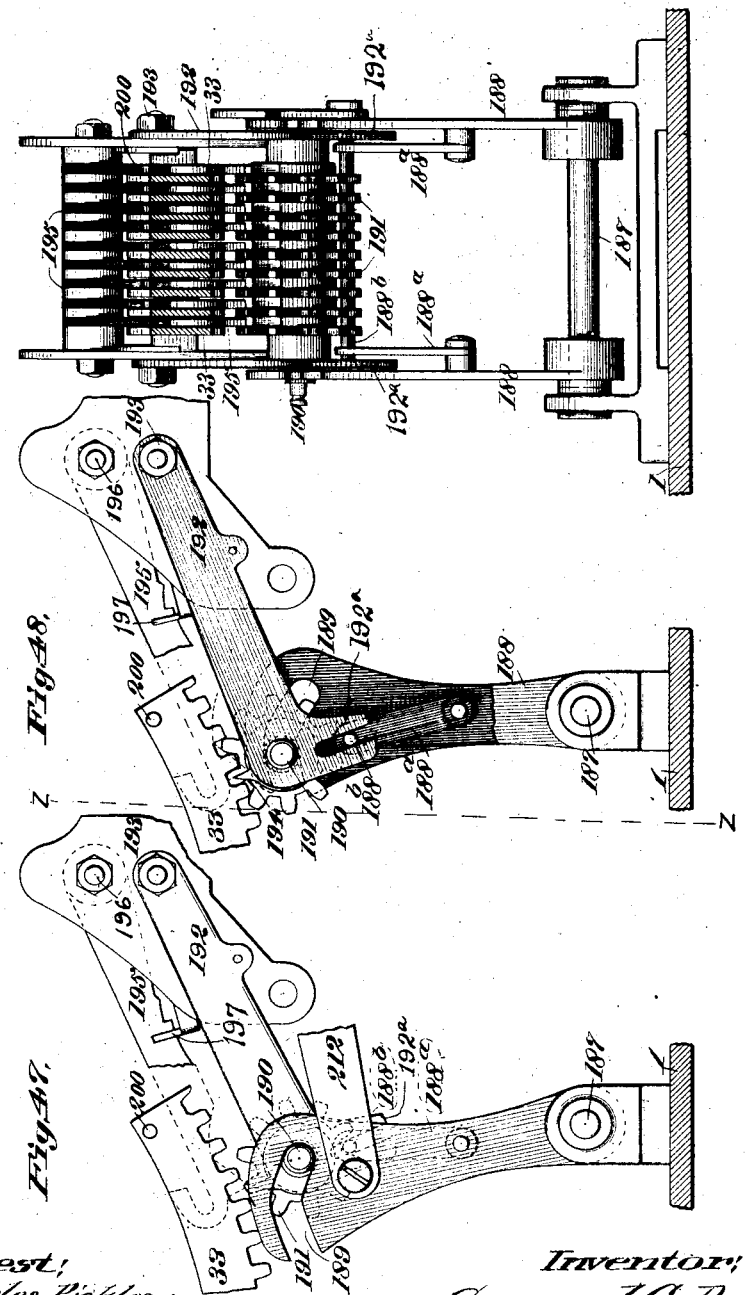

UNITED STATES PATENT OFFICE.

SAMUEL GERRY DORMAN, OF POPLAR BLUFF, MISSOURI, ASSIGNOR, BY MESNE ASSIGNMENTS, TO THE DALTON ADDING MACHINE COMPANY, OF CINCINNATI, OHIO, A CORPORATION OF OHIO.

ADDING AND RECORDING MACHINE.

1,209,817.  Specification of Letters Patent.  Patented Dec. 26, 1916.

Application filed October 16, 1906.  Serial No. 339,230.

*To all whom it may concern:*

Be it known that I, SAMUEL GERRY DORMAN, a citizen of the United States, residing at Poplar Bluff, Missouri, have invented a new and useful Adding and Recording Machine, of which the following is a specification.

This invention relates to adding and recording machines, and more particularly to machines of the cross-carriage type, in which there is a paper support or platen, a multiplicity of separately movable type carriers operable side by side to different relative positions in order to position any desired type side by side adjacent to the platen for printing, a cross-carriage controlled by keys and having parts therein to be set up to represent numbers, parts coöperating with the type-carriers and the parts in the carriage to stop the carriers at any desired positions, and total mechanism operable automatically to add the numbers recorded.

All the parts named are included in the embodiment of my invention illustrated.

The objects of my invention are to arrange the various parts to insure their correct and harmonious action and to prevent them from becoming relatively out of place; to provide locking devices in connection with the numeral keys to prevent operation of more than one key at a time, and a total key mechanism operable effectively to cause the locking devices for the numeral keys to operate and thereby prevent operation of the numeral keys when any total is being printed; to provide an error key whereby any number struck on the numeral keys may be thrown out of the machine, and a lock operable to prevent operation of the error key while any number is being recorded; to provide mechanism to control the operation of the type-carriers and associated parts so that sudden jerks, or impacts of the operating handle are cushioned or neutralized, and thereby to prevent the violent vibration of the moving parts which might otherwise occur, especially when the machine is being used by unskilled operators; to provide novel means for printing any total or number represented in the total wheels in a color distinctive from the color in which the items are printed; to provide means whereby a character will be recorded in a color distinctive from the items whenever the operating handle is drawn forward the first time after the machine has been cleared by recording a total or number from the total wheels, and thereby to indicate clearly that the machine is clear; to prevent such character from being recorded alone in such distinctive color except when the machine is clear; and generally to improve, strengthen and simplify the entire mechanism.

This invention relates specifically to the foregoing improvements combined with each other and in an adding and recording machine of the cross-carriage type of the character shown and described by Hubert Hopkins in his application for patent for an adding and recording machine filed January 24, 1903, Serial Number 140,390, patented September 24, 1912, No. 1,039,130. My invention is illustrated as embodied in a machine of that character and I do not claim herein any combinations disclosed in either of said applications except as combined with improvements above and hereafter named.

The final object, therefore, of my invention is to provide the various improvements which I have named, and others that will hereinafter appear, in connection with the said Hopkins machine or others to which they could be applied.

Figures 24, 26:
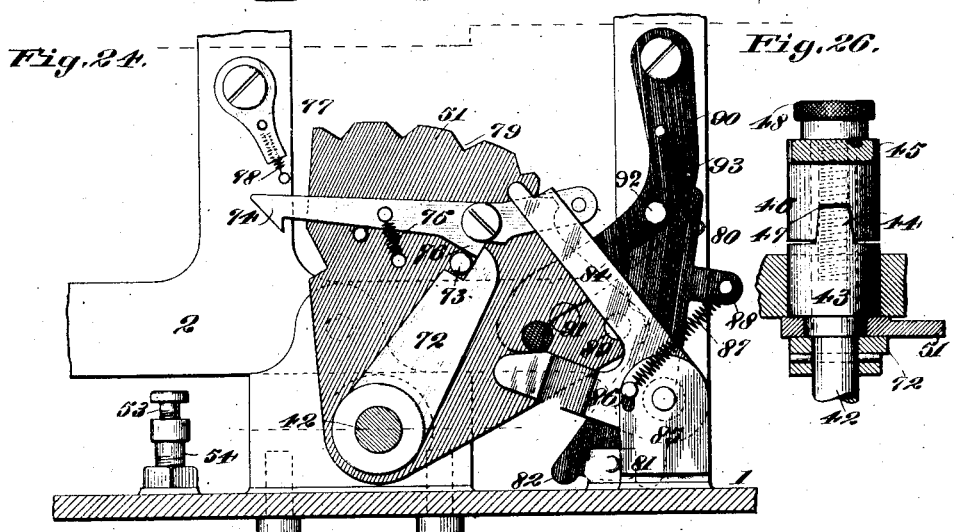
Figure 25:
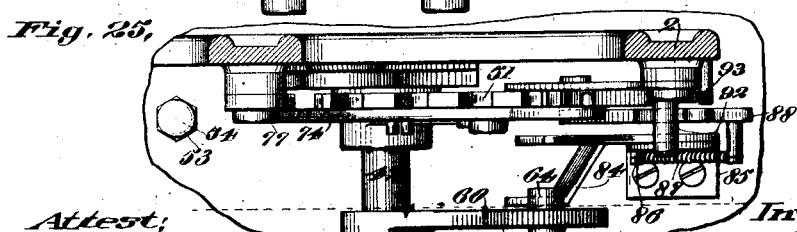
Figure 34:
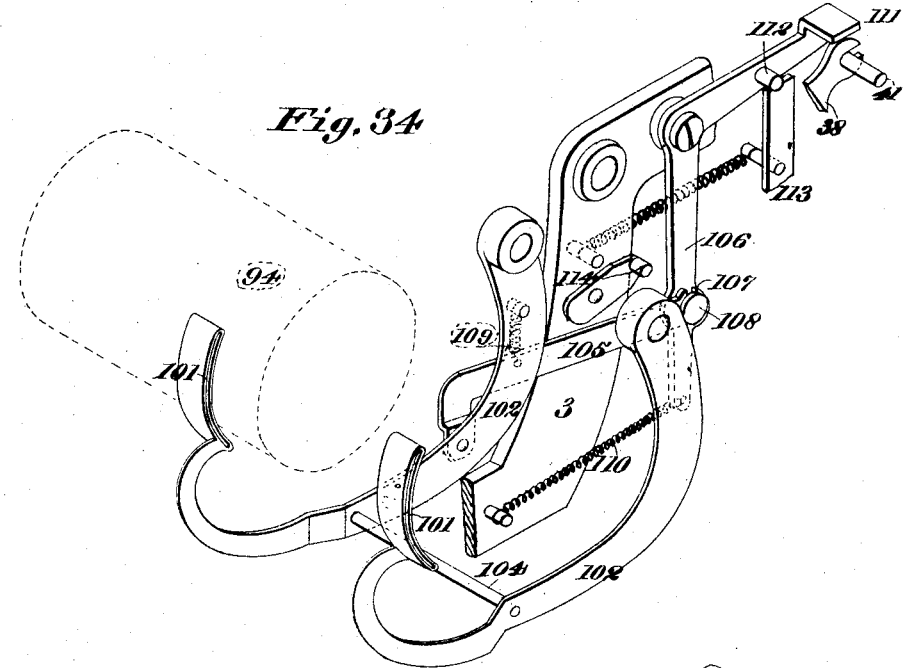
Figure 33:
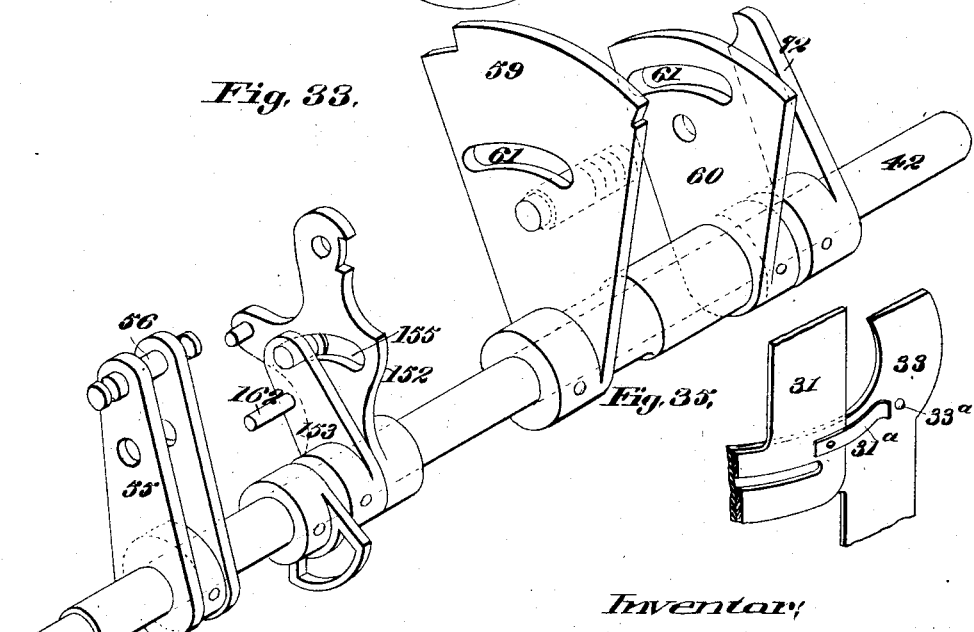

In the drawings wherein I have illustrated the improvements embodied in a complete adding and recording machine Figure 1 is a side elevation of an adding and recording machine embodying my invention. Fig. 2 is a vertical longitudinal sectional view taken between the outer and inner frames on the left side of the machine relative to the operator. Fig. 3 is a view looking toward the front ends of the key levers, and illustrates the key-locking mechanism whereby, when one key is depressed, the remaining keys will be locked against operation until said depressed key returns to idle position. Fig. 4 is a perspective view of a portion of the key locking devices. Fig. 5 shows the error key and the lock therefor which locks said key whenever the operating handle starts forward. Fig. 6 is a side view of the total key and repeat key levers. Fig. 7 is a plan view thereof. Fig. 8 is perspective of the same parts. Fig. 9 shows the end of a member which is actuated by the total key and which locks the numeral keys when operated so that said keys cannot be operated when the total key is depressed. Fig. 10 illustrates the total key stem, the locking devices therefor and the actuating means for the locking devices. Fig. 11 shows the same mechanism with the total key depressed. Fig. 12 illustrates the same mechanism with the total key partially depressed. Fig. 13 is a perspective view of the same mechanism, showing the position and relation of the various parts comprised therein. Fig. 14 shows the total key stem and a pawl device carried thereby. Fig. 15 is a perspective of the locking member whereby the total key is locked against depression when the operating handle is moved. Fig. 16 shows the end of a link which acts to control the locking pawls for the total keys. Fig. 17 shows the device which locks the total key when the mechanism has started to carry in the totalizer and has not completed the operation. Fig. 18 is a plan view illustrating the transversely movable carriage and its controlling mechanism. Fig. 19 is a side elevation thereof on a sectional line $a$—$a$ of Fig. 18. Fig. 20 is a view of escapement devices controlling step by step movement of the carriage. Fig. 21 shows the position of the parts comprising the escapement when the carriage is moving a step. Fig. 22 illustrates the mechanism controlling the main shaft and operating handle whereby, when said parts are moved to one extreme of their movement, they will be held until the other parts of the machine have had time to perform certain functions, such as recording, etc., before said shaft and handle can start back to idle position, said parts being illustrated in idle position and being viewed from the index line A of Fig. 23. Fig. 23 is a view of the same parts from the index line B of Fig. 22. Fig. 24 shows the same parts in advanced position. Fig. 25 is a top or plan view of said parts in their idle or "rest" position. Fig. 26 is a detail view of the clutch which holds the operating handle on the main shaft. Fig. 27 is a front view illustrating the mechanism which actuates the parts that control the type-carriers. Fig. 28 is top or plan view thereof. Fig. 29 is a side view of the same mechanism. Fig. 30 shows the same parts in course of operation. Fig. 31 illustrates the connections of the total key and other parts acting with the total mechanism. Fig. 32 is a perspective view of mechanism which causes return of the carriage to idle position. Fig. 33 is a perspective view of the main shaft and parts carried thereby. Fig. 34 is a view in perspective of the ribbon guides whereby the ribbon is held in proper position adjacent to the platen and whereby the ribbon is moved to and from the printing line. Fig. 35 shows a clutch device associated with the type-carriers and gear parts which move therewith. Fig. 36 is detail view showing the arrangement and manner of operation of the printing parts. Fig. 37 is a sectional view through the hammer section showing the arrangement of the printing hammers. Fig. 38 shows the trip devices for releasing the hammer in units place at the first operation of the operating handle after the machine is cleared by recording a total contained in the total wheels, which operation results in printing a character in a color distinctive from the color of the item records. Fig. 39 is a detail view of the part associated with the link that causes release of the hammers when the handle is operated. Fig. 40 is a front side or edge view of the parts that coöperate with the mechanism for moving the total wheels into and out of mesh with the operating racks. Fig. 41 is a view thereof from the index line C in Fig. 40. Fig. 42 is an enlarged view of one of a series of duplicate trip levers forming part of the totalizing mechanism and shows the shallow notch in the hooked end of said lever, said notch being the arc of a circle whose center is the axis of the pivot of the lever. Fig. 43 is an enlarged view of one of the total wheels showing the carrying teeth thereon, said view being on the line X of Fig. 44. Fig. 44 is a sectional view on the line Y of Fig. 43. Fig. 45 is a sectional view of a portion of the cross-carriage and shows the devices which act to release the type-carrying parts and gear parts when the total key is operated. Fig. 46 is a view corresponding to Fig. 3 but omitting the latch and lock pawls coöperating with the total key, this view showing clearly the arrangement of the total key lever and the key locking devices. Fig. 47 is a left side elevation of the totalizing mechanism disconnected from the actuating gear parts. Fig. 48 is a view thereof when in operative connection, one of the supporting arms being broken off to illustrate the other parts. Fig. 49 is a sectional view on the line Z—Z of Fig. 48.

The base 1 supports two side frames 2 between which, also resting upon the base, two inner frames 3 are mounted. The key levers 4 are mounted in relation to form a convenient key-board. There are ten of these key levers, being one for each of the ten numeral characters or figures. Their rear ends are bent laterally, some more than others, so that the terminals thereof are disposed in a longitudinal row. The levers, therefore, being pivoted at a common point are of graduated lengths behind their pivots. The lever extending farthest to the rear is the lever for zero or the character "0": the next longest is for the digit "1", the next is for the digit "2", and so on, the lever for "9" being the shortest behind the pivot. Each lever except the one for "9" has a terminal point or projection 5 on its rear end, and on the front ends of said levers are key-heads or buttons 6, each of which bears the character that it represents. The rear ends of these levers are held downward and the front ends upward by springs 7 (Fig. 2) connected to said levers and to the base of the machine behind the pivots. Near the rear end of the machine two track members 8 are supported transversely of the machine by standards or posts 9, and a carriage 10 is arranged to travel on said track members. This carriage has a series of rows of pins or other parts 11 arranged to move substantially vertically therein when actuated by the projections 5 which strike their lower ends when the keys are successively depressed. The arrangement of these pins, and the method of their operation by the keys to set up numbers, are the same as fully described in the said two applications of Hubert Hopkins and, therefore, are not shown in detail. The carriage is carried by rollers or wheels 12 operating on the tracks, two of said rollers being grooved on their peripheries (Figs. 18 and 19). The flanges formed by the grooves prevent the carriage from moving toward the ends of the machine and thereby being displaced or derailed. To the side of the carriage having the grooved rollers a number of hooks 13 are fastened and extended around under the track member to prevent wrecking or derailment of the carriage when the machine is tilted laterally or endwise or over on its top. This is an important feature as a safeguard to prevent displacement of or damage to the machine when handled roughly, as in shipment. The pins 11 are in longitudinal and transverse rows, there being nine in each longitudinal row, which is one for each key except the "9" key. Corresponding to the "9" key a plate 14 is attached to the side of the carriage toward the front of the machine. The idle or clear position of the carriage is at the right of the machine relative to the operator and when in such position the left longitudinal row of pins 11 is over the ends of the levers 4, each pin in said row being over the end of the lever to which it corresponds so that if any one of said levers be operated by depressing the key thereon the corresponding pin will be raised. Upon release of the lever the carriage moves one step leftward which brings the next row of stops over the terminals of the key levers. This step by step movement is accomplished by an escapement mechanism, part of which is novel. A rack 15 projects leftward from the carriage and is in mesh with a gear segment 16 on the vertical shaft 17 which is supported at its lower end in a bearing on the base of the machine and at its upper end by a plate or bar 18. A spring motor 19, of known construction, is arranged in connection with the shaft 17 and actuates said shaft to draw the carriage leftward. The escapement, mentioned above, comprises a toothed segment 20, attached to the shaft 17, on the arcuate edge of which are a number of teeth 21 having oblique or inclined sides toward the carriage (Figs. 18, 20 and 21) and vertical sides away from the carriage; an escapement bar 22 resting crosswise upon the key levers and extending adjacent to but slightly below the teeth 21 and being raised and lowered with the ends of said levers, a flange or tooth 23 on said bar extending toward the teeth 21 and engaging therewith when the bar is raised (Fig. 21), but not when the bar is lowered; and a pawl 24 pivoted to said bar 22, and having its free end resting on the flange or tooth 23, and a small roller 25 riding on the top of the segment 20, said pawl being actuated downward by a spring 26. The end of the pawl extends beyond the inner side of the tooth or flange 23. The idle or rest position of the parts, as shown in Fig. 20, is that in which the bar 22 is down and the pawl 24 between two teeth 21. When a key is operated the bar 22 is raised, the pawl 24 also being carried upward. Before the pawl passes above the tooth 21 with which it engages, the tooth or flange 23 is in position to engage said tooth 21, which it does as soon as the pawl releases the said tooth 21, the parts then being as shown in Fig. 21, in which the end of the pawl rests on the top of the tooth 21, the shaft 17 having turned a slight distance. When the key is released and the bar 22 lowers the tooth or flange 23 is drawn below the teeth 21, whereupon the motor 19 quickly turns the shaft until the tooth 21 on which the pawl 24 had rested passes from under the pawl, at which time the spring 26 snaps the pawl down in advance of the next or approaching tooth to stop further revolution of the shaft. Successive operations of one or more keys repeat the action, each step being sufficient to draw another row of pins 11 over the ends of the levers 4. The outer side of the pawl is inclined or oblique like the inner surfaces of the teeth 21, so that the shaft 17 can turn freely in the opposite direction as required to move the carriage back to idle position.

Near the front end of the machine a plate 27 is mounted. Said plate has a series of notches 28 wherein the key levers 4 operate, said plate acting as a guide and reinforcement for the levers to prevent them from becoming bent. Between the key levers a number of locking plates or pawls 29 are pivoted. Each plate or pawl has an enlargement 30 on each side of its lower end, extending under the adjacent key levers and against the next adjacent pawls, so that when any key lever is depressed it pushes the two nearest pawls laterally, and thereby all other pawls. Obviously no other key lever can be depressed until the first operated have returned to idle position to permit free movement of the pawls. This also prevents the simultaneous operation of two or more keys, being a safeguard against error to that extent.

The type-carriers 31 are, in the present instance, arcuate in form and are suspended from a shaft 32. A gear part 33, also arcuate in form, is coupled to each type-carrier by a pin and slot connection 34, which allows the type-carriers to move to position for recording "0's" without any movement of the gear parts. The gear parts are also suspended from the shaft 32. Each gear part has a projection 35 on its lower and rear end. The number of rows of pins 11 and type-carriers, and, therefore, gear parts 33 are equal and, when any number has been set up in the carriage as before described, the projections 35 will engage the pins representing the number on forward movement of the type-carriers and gear parts and thereby cause the correct number to be recorded. These parts act the same and are the same as described in the two applications of Hubert Hopkins aforesaid, and since they are not original nor are claimed herein, they need not be shown nor described in extended detail. The type-carriers 31 have arms 36 (Figs. 1 and 2) which are joined to the gear parts by springs 37 tending to actuate said type-carriers and gear parts in opposite directions. Two angular levers 38 are supported by the shaft 32, one at each side of the type-carriers and gear parts. The depending arms of said levers are connected by a rod 39 which extends crosswise in front of the type-carriers and gear parts. The other arms of said levers project rearward and are connected by a rod 40, and springs 41 connect said rod with the arms 36 of the type-carriers.

A sort of brake or friction device is arranged for each type-carrier and its gear part to restrain them in their relative movements. Each type-carrier carries a spring 31ª (Fig. 35) on its rear end, and when any type-carrier moves forward its said spring rubs against the gear part paired with said type-carrier, thereby restraining the type-carrier from too rapid movement. The gear parts have rounded lugs 33ª which said springs encounter so that they will offer the needed resistance even when considerably worn.

The main shaft 42 is journaled in bearings transversely and conveniently near the front end of the machine. One end of the shaft has a clutch member 43 (Fig. 26) loosely mounted thereon, and provided with one or more teeth or tenons 44 projecting outward. The operating handle 45 is provided with a hub 46 fitting on the end of the shaft outside the clutch member 43 and having notches 47 to receive the said teeth or tenons 44. The end of the shaft is provided with an axial threaded bore into which the threaded end of a clamp piece 48 screws in a well understood manner to bind the handle in engagement with the clutch member. A socket 49 is attached to the base of the machine in front of the operating handle and a piece 50 of rubber or other suitable material fits in the socket and forms a cushion for the handle when the latter is drawn forward. A cam 51 is loose on the shaft and is attached to the clutch member 43 and, when in idle or rest position, abuts upon an adjustable stop 53 having a head (Figs. 1, 22 and 23) and which screws into a hollow stud 54 affixed to the base 1 of the machine. When idle or at rest the handle 45 is substantially vertical. Two substantially vertical arms 55 are rigid with the shaft 42 (Figs. 2 and 33) and carry a strong stud 56 near their upper ends. To said stud two strong springs 57 are connected, the opposite ends of said springs having hooks 58 engaged in holes in the base, and holding the main shaft 42 and all parts controlled thereby in idle position and acting to restore them to such position when operated. A cam 59 is attached to the shaft 42 and, at a slight distance therefrom, a plate 60 is fastened to the shaft. Said cam and plate have matching arcuate slots 61 formed therein. A link 62 is connected to one of the levers 38 and extends obliquely forward (Fig. 1) and has a frame 63 attached to its front end. The link rests against the cam 59 and lateral lugs or studs 64 on the link and frame 63 project into the slots 61 and are movable therein. Two arms 65 are rigid with the lugs 64, project forward, and their free ends are connected by a rod 66. A projection 67 is rigid with the cam 59, and strong springs 68 are interposed between the said projection and the rod 66, (Figs. 27, 28 and 29) thereby holding the frame 63 and the link 62 forward so that the lugs 64 are against the front ends of the slots 61. Obviously when the shaft 42 is oscillated by the operating handle the cam 59 and plate 60 are moved therewith, and the spring 68 then acts to draw the link 62 forward, said link operating the levers 38 and releasing the type-carriers and gear parts from restraint by the rod 39. The springs 37 then move the type-carriers forward as far as permitted by the pin and slot connection 34, and the springs 41 then move such of the gear parts as may have been released until the projections 35 strike the pins 11 which had been set up in the carriage. This stops the type-carriers and the required type thereon are side by side in position for printing. The other gear parts are held against forward movement by a stop piece 69 pivotally supported by the carriage 10 in front of the projections 35. As the keys are operated this stop piece, which in idle position is in position to hold all the gear parts against forward movement, is moved step by step leftward, each step moving out of the path of one of the gear parts in consecutive order from lower to higher orders. It is obvious, therefore, that only the type-carriers corresponding to the pins 11 which had been set up can move to record when the operating handle is drawn forward. When at rest the gear parts are back just far enough not to contact with the stop 69, which can be moved downward out of the path of the projections at necessary times as hereinafter explained.

A dash-pot 70 is pivoted to the base or frame of the machine and the piston thereof has a rod 71 pivoted to the frame 63 to cushion the parts and regulate the speed of operation of the link 62 and mechanism controlled thereby.

As before stated, the cam 51 is loose on the shaft 42. Alongside of the cam an arm 72 (Figs. 22 to 26) is attached to the shaft 42 and a pin or lug 73 on the cam projects behind the rear edge of the said arm, so that when the operating handle is drawn forward to operate the type-carriers as just described the shaft will be rotated as required to produce such operation. In some cases careless operators would attempt to throw the operating handle violently back to idle position and if the handle were rigid with the shaft 42 the parts connected to the shaft would be shocked or jarred. The handle, therefore, being loose on the shaft may be thrown back with any speed or force, and the pin 73 will leave the arm 72, and the shaft and parts controlled thereby will be drawn back by the springs 57 at a velocity determined by the dash pot. No strain or violent vibration can result. The handle will be stopped in its correct idle position by the cam 51 striking the stop 53. A hook 74 is pivoted to the cam 51 and is actuated by a spring 75 and when the cam reaches the stop 53 in advance of the arm 72, said hook engages the said stop (Fig. 22) and prevents the handle from being again drawn forward before the shaft 42 and the controlled mechanism have returned to rest. A projection 76 on the hook is engaged by the arm 72 when the latter catches up with the cam and handle, and said hook is thereby released so that the handle can again be drawn forward.

To prevent return of the handle and thereby the shaft 42 and other mechanism before completing a stroke on which they have started, a pawl 77 is provided. Said pawl is pivoted to the frame 2, and is provided with a spring 78 to hold it in proper position. A plurality of notches 79 are formed in the upper edge of the cam 51 and when said cam starts forward the pawl rubs along the notched edge. If the handle be released before completing the stroke the pawl will engage in the notch last passed and thereby hold the parts from being returned. Just as the handle strikes the abutment 50 the rear edge of the cam 51 passes from under the pawl, permitting it to be returned to idle position as shown in Fig. 24.

The yielding connection between the shaft 42 and the link 62 permits the handle to complete its stroke and strike the abutment 50, before the link and the parts controlled thereby complete their stroke which is necessary in order to insure correct records. The handle and shaft 42 are therefore held at the end of their stroke until the other parts are ready to start back, and are then automatically released. A plate 80 is pivoted at 81, and has two projections 82 to strike against the base and limit movement thereof. A hook 83 is formed on said plate. A substantially V-shaped two arm lever 84 is pivoted to a support 85, and a pin 86 on said lever projects through a slot in said support and limits the oscillation of the lever. A spring 87 connects said pin with a forwardly projecting arm 88 on the plate 80 and thereby actuates both arms of said lever upward and the plate 80 backward, both at the limit of their movements in such directions. A pin 89 on the cam 51 rubs along the edge of the plate 80 as the cam swings forward and finally passes below the hook 83 which will hold the cam and thereby the shaft 42 until the spring 68 draws the link 62 and other parts to the end of their strokes. As soon as the said parts reach the end of their forward stroke the lug 64, which projects through the slot in the plate 60, strikes one arm of the lever 84. A lever 90 is pivoted to the frame 2 and extends over a lug 91 on the cam 51. A projection 92 on said lever extends into a notch formed in the end of the lever 84 and is thereby upheld when the cam 51 swings forward. A spring 93 draws said lever downward. When the lug 64 strikes the lever 84 it draws the end of said lever 84 from under the projection 92 and the lever 90 is then snapped down by its spring 93. The projection 92 strikes the edge of the plate 80 and drives the same forward releasing the hook 83 from the pin 89 and permitting all parts to return to idle position. As the cam 51 travels back the lug 91 raises the lever 90 to a sufficient altitude to restore the projection 92 into the notch in the end of the lever 84.

The platen 94 is supported by a frame or carriage 95, and to the ends of the platen shaft 96 knobs 97 are attached for manual rotation of the platen. Near the sides of the machine the ribbon spool shafts 98 are supported vertically and the ribbon spools are attached to the upper ends thereof in front of the platen. A ribbon 99 winds on said spools and extends across in front of the platen just below the printing line. The ribbon passes behind guide posts 100 and through two loops or hooks 101 arcuate with axis of the platen as a center in order to conform to the surface of the platen. The loops or hooks are on the front ends of the arms or levers 102 which are curved downward and upward and are attached to a rock shaft 103 supported by the frame that upholds the carriage 95. Said levers are connected and braced by a rod 104, so that both will move together. A link 105 connects one of said levers 102 with the vertical arm of an angular lever 106 pivoted to one of the inner frames 3. The connection between said link and the lever 106 consists of a hook 107 (Fig. 34) held in engagement with a stud or button 108 by means of a spring 109 so that said parts are readily separable. A spring 110 connects the lower arm of the lever 106 with the frame 3 (Fig. 2), thereby actuating the levers 102 forward as required to raise the ribbon to the printing line. The other arm of the lever 106 projects rearward and has a lateral projection 111 extending over the arm of one of the levers 38 which, through the various connections described, holds the ribbon below the printing line so that the last record produced will be visible to the operator without moving the platen or paper more than a line space. The ribbon 99 may be multichrome, so that the items and the totals thereof may be recorded in different or distinctive colors. Such is the embodiment illustrated, the upper portion of the ribbon being of one color and the lower portion thereof of another and distinctive color (Fig. 1). It is obvious that, to place the distinctive colors of the ribbon at the printing line at proper times, the stroke of the lever 106 must be controlled. When items are being recorded and the arms of the lever 38, on which the projection 111 rests when idle, is lowered, the spring 110 acts to raise the ribbon to the printing line. The upper strand of color is stopped at the printing line by a lug 112 striking the upper end of a lever 113 which is pivoted to some part of the frame. If the lever 113 be swung out of the way of the lug 112 the lever 106 will be further operated by its spring 110 a sufficient distance to place the lower strand of color of the ribbon at the printing line, and said parts will be stopped at the right position by the lever 106 striking a projection 114 on the adjacent frame 3.

On the front end of each of the type-carriers 31 a frame or type-frame 115 is attached, and a series of types 116 operate therein. There are ten types on each carrier, the foremost representing "0," the next adjacent representing "1," the third one from the end representing "2" and so on in sequential order to the last one from the front which represents "9." These types are spaced the same as the parts 11 in the carriage 10, and when the type-carriers move forward on operation of the handle 45 and are stopped by the gear parts 33 engaging with the parts 11, the types on the carriers corresponding to the number set up by the parts 11 will be stopped side by side in front of the platen in position for printing (Fig. 36). Prior to the type being positioned the ribbon 99 is moved in front of the printing line in position to receive the blow of the type. The various connections from the shaft 42 allow the type carriers to reach the end of their stroke and to position any desired types for printing before the handle strikes the abutment 50. The types which record in each instance, therefore, become stationary for a time while the handle is moving, which time is sufficient for them to be driven to record and rebound before starting back. For driving the types a series of hammers are used. The hammers and co-operating parts are mounted in a section between the two inner frames 3 in front of the type-carriers. The section is composed of two plates 117 one of which is attached to each frame 3. Near the upper rear corner of this section (Figs. 36 and 37) a shaft 118 is mounted and a series of hammers 119 are pivoted on said shaft. There is one hammer for each type-carrier. Springs 120 connect downward projections on the hammers behind the shaft 118 with a rod 121 in front of the shaft and are strong enough to throw the hammers, when released, upward against the types positioned at the printing line and to drive the types with sufficient force to record. The hammers are held in idle position (Fig. 37) by pawls 122 pivoted to a rod 123 and provided with hooks to engage with hooks on the hammers. The hammers and pawls are provided with hooks to engage together as shown, the edges of the said parts being rounded so that when the hammers are forced down they automatically engage with the hooks on the pawls. Swing of the pawls is limited by a rod 124 extending crosswise through slots 125 in the pawls above their pivots. A bar or plate 126 is pivoted to each pawl, and project rearward through slots formed in a transverse guide piece 127. Springs 128 connect said bars 126 with a rod 129 thereby actuating the pawls rearward as required to retain engagement with the hammers. A tongue 130 on each bar 126 (except the one in units place) extends under the next adjacent bar in lower order, so that if one bar be raised all others in lower orders will likewise be raised. A rod 131 supports a series of levers 132 the front ends of which project under the rear ends of the bars 126 and the rear ends of which extend under the type-carriers 31 and in close proximity thereto. It is obvious that, if the rear ends of the levers 132 be lowered, the rear ends of the bars 126 will be raised in opposition to the springs 129. A shoulder or projection 133 is on each type-carrier (Figs. 2 and 36) in position so that when the type-carriers travel forward beyond "0" printing position the rear ends of the levers 132 will be lowered by said shoulders thereby raising the bars 126. The shaft 118 which supports the hammers is a rock shaft and has two arms 134 (Figs. 36 and 37) attached thereto and a bar or rod 135 is carried by said bar, in idle position just under rearward projections 136 on the hammers. A crank arm 137 is attached to one end of the shaft 118 and a curved link 138 has its rear end pivoted to one of the levers 38 and an inclined slot 139 in its front end through which a screw extends, thereby connecting said link to the crank arm 137. As the levers 38 are swung forward to permit the type-carriers to travel, the link 138 will press upon the crank arm 137 and thereby rotate the shaft 118 and lower the bar 135. The type-carriers travel forward until stopped by the parts 11 in the carriage 10, the required types at such time being side by side at the printing line. The shaft 118 is rotated slowly. A plate 140 is carried by the link 138 by pin and slot connections 141, permitting it to move relative to said link. A cam-like part 142 is on the rear end of the plate 140 and, as the rod 39 is carried forward by the levers 38, said rod 39 rubs along the edge thereof and advances the same quickly against the crank arm 137. The ends of the bars 126 which have been raised are in the way of the bar 135 and are pushed forward by said bar very quickly as the plate 140 strikes the arm 137, and the pawls 122 connected to the bars so moved are released from the hammers 119 which are immediately thrown against the alined types and drive them to record. The hammers rebound after they strike and stand a slight distance away from the types. When the handle is released and the levers 38 start to return to idle position, the link 138 draws the bar 135 upward toward its former position. Said bar at once engages the projections 136 on the hammers that had been operated and restores them gradually to their lowered position and engages them with their pawls 122.

On some occasions it may be found desirable to prevent printing in a varying plurality of orders, at the will of the operator. By reference to Figs. 36 and 37 it will be noted that the pawls 122 have upwardly extended portions 122ª which are distant from the hammers 119, so that the operator may manually disengage any of the pawls 122 before the type-carriers reach their printing positions, and before the bar 135 releases any of the pawls. This disengagement may be effected by manually engaging the projecting ends of the pawls, which are conveniently available to the operator at the front of the machine, and drawing the pawls out of engagement with their hammers. When thus disengaged the springs 120 cause the hammers 119 to rise as the bar 135 descends, without sufficient percussive force, however, to drive the type to record. Since all of the pawls 122 are accessible at the front of the machine they are optionally operable and are adapted selectively and at the will of the operator to be disengaged in a varying plurality of orders, and thereby prevent percussive action of the hammers.

The carriage 10 and the parts 11 therein which had been set up to represent the number recorded are automatically restored to idle position, when desired, after the number has been recorded. A lever 143 (Fig. 31) is pivotally supported at its upper end and the lower end thereof is connected with a link 144 the rear end of which carries a rack 145. The rack 145 meshes with a gear segment 146 having a hub loosely mounted on the shaft 17 and resting upon a collar 147 rigid with said shaft. Said collar 147 has an arm 148 provided with a lug 149. A lug 150 (Fig. 19) is on the under side of the gear segment 146 in position to engage with the lug 149 when said segment is rotated on the shaft. A spring 151 connects the lever 143 with the inner frame 3 and holds said lever and thereby the rack 145 forward. An arm 152 is loosely mounted on the shaft 42 alongside of an arm 153 which is rigid with the shaft. A pin 154 on the arm 153 projects through an arcuate slot 155 in the arm 152, thereby defining the swing of said last-named arm. A pawl 156, comprising a horizontal arm with a hook on its front end and a vertical arm, is pivoted to the upper end of the loose arm 152. A spring 157, connecting said pawl and the rigid arm 153, actuates said pawl and the arm 152 carrying the same backward. The vertical arm of the pawl 156 in idle position abuts against a stationary part 158 thereby depressing the front end of the pawl. Swing of the pawl on its pivot is limited by a pin 159 thereon projecting into a notch in the arm supporting the same. A pin 160 is on the side of the lever 143 along which the pawl passes when moved forward. When the operating handle is drawn forward the arms 152 and 153 are oscillated, the former carrying the pawl 156 the front end of which raises gradually as the pawl moves away from the part 158. The hook on the pawl passes beyond the pin 160 for a considerable distance and engages said pin when carried backward. The hook does not engage the pin until the gear parts 33 have returned to their backward position and then the hook draws the lever 143 and the link 144 backward in opposition to the springs 151. The gear segment 146 engages the arm 148 and thereby rotates the shaft 17 and forces the carriage 10 toward its first position. A supporting part 161 attached to one of the frames 2 (Figs. 18 and 19) has a series of arms 162 projecting over the carriage 10, there being one of said arms for each transverse row of parts 11 in the carriage. The inner ends of said arms curve upward so that when the carriage is forced thereunder the parts 11 that had been set up will be forced down, their upper ends being rubbed along the under side of said arms. As the shaft 42 approaches its idle position, the vertical arm of the pawl 156 engages the part 158, and, about the time that the shaft stops, the pawl is lowered out of engagement with the pin 160 and the spring 151 thereupon restores the lever 143, the link 144 and the rack thereon, and the gear segment 146 to their idle positions. The carriage motor 19 also acts to draw the carriage a very slight distance leftward to carry the first row of parts 11 from under the arms 162 so that the said parts 11 may again be acted upon by the keys.

Sometimes it is desirable to record or repeat the same number two or more times. Under such circumstances that number should be kept set up in the carriage 10 and the handle drawn forward the necessary number of times. The carriage will remain in position under the typecarriers and gear parts if the pawl 156 does not engage the pin 160. To prevent such engagement a "repeat" key and associated parts are provided. The key 163 is connected to the front end of a lever 164 which is pivoted upon a supporting rod 165 and the rear end of which is actuated downward by a spring 166. The end of the lever 164 is pivoted to an arm of a plate 167 which is pivotally supported by a post 168. The upper end of the plate 167 carries a shield 169 which, when the key 163 is depressed, is moved under the pin 160 on the lever 143. When the shield is located under the pin 160 it is obvious that the pawl 156 can not engage the pin but will oscillate back and forth without moving the carriage 10 to its idle position. This leaves the number which had been originally set up in the carriage so that the same number may be recorded as often as desired by striking the same once on the keys. To hold the key 163 depressed a notch 170 (Fig. 2) is formed therein to engage under the plate 170ª through which the key stems project. After release of the notch 170 from the plate 170ª the spring 166 at once acts to restore the parts to idle position, so that at the next operation of the handle the pawl 156 will engage the pin 160 and thereby restore the carriage to its original position.

Error is sometimes made in striking the keys, causing the wrong number to be set up in the carriage 10, and it is not desirable to record such wrong number. Provision is made to dissipate or throw out any number set up in the carriage without moving the operating handle or recording the number. A key 171, which I term an "error key", is arranged to operate through the base 1 and is held up by a spring 172 encircling the stem thereof. A shaft 173 (Figs. 2 and 3) is supported in bearings under the base and has an arm 174 projecting rearward under the end of the key 171 so that when said key is depressed it will rock the shaft. A crank arm 175 is rigid with said arm, and a link 176 connects said crank arm with a crank arm 177 attached to a shaft 178 under the rear end of the base. A lever 179 is fastened to the shaft 178 and projects through a slot 180 (Fig. 18) in the base and extends in front of a projection 181 on the rack link 144, so that when the upper end of said lever 179 is moved backward by depression of the key 171 the rack 145 will be drawn rearward and restore the carriage to its starting position, as above described in connection with the description of the operation of said rack 145. The spring 151 acts to restore the rack and the lever 179 and associated parts to idle position upon release of the key 171. A pawl 182 (Figs. 1 and 5) is pivoted to a support 183 a short distance behind the key 171 and is actuated toward said key by a spring 184. A series of notches or teeth 185 are on the rear side of the key 171 wherewith said pawl may engage when in contact with the key and thereby prevent operation of the key until said pawl be removed. A link 186 extends from said pawl to the projection 64 on the link 62 and is provided with a long hook on its rear end engaging said projection. When the handle is drawn forward the link 62 also moves thereby allowing the spring 184 to act to engage the pawl 182 with the teeth 185 on the key 171. The said key 171 will, in this manner, be held against operation whenever the handle is on a stroke so that the carriage 10 can not be moved until the machine is at rest. Backward movement of the link 62 draws the link 186 rearward and releases the pawl from the key 171.

The items, whether distinctive or the same item repeated or both, are automatically added together as recorded. A rock shaft 187 (Figs. 2, 18 and 31) supports two arms or levers 188 each of which has a curved slot 189 near its upper end, said slots running substantially horizontal for some distance and then obliquely downward and forward. A shaft 190 has its ends extending into said slots and a series of wheels 191 are mounted on said shaft. There is one of said wheels for each of the gear parts 33 and when said wheels are at their highest position they mesh with said gear parts. The shaft 190 is connected to the rear ends of two links or retainers 192 the front ends of which are pivoted to a shaft 193, and said shaft 190 is thereby braced against displacement so that if the arms 188 be oscillated the shaft and thereby the wheels 191 will be alternately lowered and raised. A disk 194 is attached to each wheel 191 (Figs. 43 and 44), said disks being of less diameter than the internal diameter of the wheels. A tooth 194$^a$ is integral with each disk, said teeth lying against the "0" teeth on the wheels. Each wheel 191 and its attached disk 194 are fixed upon a hub or bushing 190$^a$ which is slightly longer than the thickness of the wheel and disk. The ends of the various hubs or bushings abut together, but are loose, and hold the separate wheels and disks out of contact, thereby preventing friction between said parts (Fig. 44). Two arms 188$^a$ are pivoted at their lower ends to the arms 188 (Figs. 48 and 49) and on their upper ends carry a rod 188$^b$ which is between the teeth on the wheels 191 when they are in their lowered position, but said wheels, when in mesh with the gear parts 33 are above said rod and free to turn. The said rod 188$^b$ serves to aline the wheels and to prevent displacement or accidental rotation thereof when lowered and causes them to remain in the same relative position which they occupied when disconnected from the gear parts. Two fingers 192$^a$ on the links 192 serve to hold the rod in elevated position when free from the wheels, so that the wheels will properly engage the rod again when lowered again. The rod engages with the teeth on the wheels and holds the same against rotation when they are in their lowered position whether any number is represented in the wheels or not. Obviously the wheels can be turned or rotated only when they are free from the rod; and they are free from the rod only when in mesh with the parts 33, so that they rotate only when the gear parts move. This avoids any chance of said wheels becoming set by accident to represent a number as might occur were there nothing to hold them when disconnected from the actuating gear parts 33.

A series of trip levers 195 are pivoted upon a rod or shaft 196 and project rearward between the front ends of the gear parts 33 and between the wheels 191, being braced and sustained by a toothed plate 197, the teeth of which project between said levers. The rear of each lever 195 is provided with a hooked portion 198 projecting forward and provided with a shallow rounded notch 199 in its extremity. A pin 200 is on each gear part, except the gear part in units order, and projects toward the right relative to the operator and, in idle position, rests in the notch 199 against the hooked portion 198 of the lever 195. The levers, therefore, form stops to hold the gear parts when the machine is idle and clear of numbers, and the notches 199 assure that the gear parts will be caught by their proper levers when moving backward during rapid operation of the machine. The space between the hooked portions 198 and the body of the levers is sufficient to receive the pins 200, and their depth is equal to the space over all between two teeth on the gear parts or wheels. In idle position the lugs or trips 194 abut against the rear sides or edges of shoulders 201 on the levers 195.

A rock shaft 202 (Figs. 1, 36 and 37) is supported under the hammer section near the front of the machine and has a bifurcated member 203 attached thereto. A lever 204 is loosely mounted on the end of the shaft 202 and has a lug 205 projecting between the two arms of the member 203. This permits the lever 204 to turn a slight distance, or oscillate, without interference with the shaft, and the shaft may be rocked by pushing the lever farther in either direction. The said lever 204 projects downward into the path of travel of the cam 59 and, when the operating handle is drawn forward, said cam engages the end of said lever and rocks the shaft 202. A lever 206 is attached to the opposite end of said shaft 202 and when at rest, extends obliquely downward and backward. An arm 207 (Figs. 36, 40 and 41) is attached to the shaft and has a projection 208 near its free end. Two levers 209 are pivoted one at each side of the projection 208 and are drawn together by a spring 210 which acts to restore the shaft 202 and associated parts to idle position after operation. A pin 211 projects outward near each end of the lever 206, and a link 212 which is pivoted to one of the arms or levers 188 projects forward between said pins 211. A notch 213 is formed in each edge of the link 212 and the pin 211 on the upper end of the lever 206 normally rests in the notch on the upper edge of said link. As previously stated the wheels 191 are in mesh with the gear parts 33 when the machine is idle. When the handle starts forward to cause any item to be recorded the cam 59 strikes the lever 204 and rocks the shaft 202 and causes the lever 206 to push the link 212 backward. Said link pushes the arms or levers 188 backward and the shaft 190 is drawn down into the lower ends of the slots 189 and the wheels 191 out of mesh with the gear parts 31. Just as the cam 59 completes its forward stroke, which it does just after the record has been produced, it passes beyond the lever 204. When the cam starts back toward its idle position it again strikes the lever 204 and rocks the shaft 202 in the opposite direction and causes the lever 206 immediately to draw the link 212 forward as required to raise the wheels 191 into mesh with the gear parts. The gear parts then rotate the said wheels backward introducing the record number therein, and the gear parts are stopped by the pins 200 thereon striking within the shallow notches 199 on the ends of the hooked portions 198 of the levers 195. For the gear part 33 in units order, for which there is no lever 195, there is an abutment 214 (Fig. 1) against which the rear edge of the gear part strikes. When, during the process of addition, it is necessary to carry or transfer from lower to higher orders the gear parts are moved an additional distance in order to rotate the wheels 191 a further distance. This is caused by the lug 194 of the wheel which completes a revolution rubbing under the shoulder 201 on the lever 195 which acts as a stop for the gear part meshing with the wheel 191 in the next higher order, and thereby raising said lever 195 a slight distance. The distance to which said lever is raised is sufficient to permit the pin 200 on the coöperating gear part 33 to pass below the hooked portion 198. The gear part is then released and may move backward a distance of one tooth thereby operating its wheel 191 and withdrawing therein the transferred or carried digit. This transfer mechanism operates in the same manner as described in the two applications herein before identified and, for such reason and not being novel herein, is not shown nor described in further detail. For present purposes it is sufficient to assume that the items are properly added by or introduced into the wheels 191, the specific operation or construction thereof being immaterial.

Since the wheels 191 are drawn down out of mesh with the gear parts 33 on forward movement of the latter means must be provided, in order to record any number or total represented in said wheels, to hold said wheels in mesh with the gear parts while the latter and the type-carriers travel forward. A "total key" 215 operates through a slot in the key-board plate 170ª and is upheld, and actuated upward when depressed, by a spring 216 (Fig. 10) connected to a projection 217 on said key and to the plate 170ª. Said key has a vertical slot 218 which receives a stud on a lever 219 which is pivoted upon the shaft 165. The rear end of the lever 219 is pivoted to another lever 220 (Fig. 31) supported on a stud. A link 221 connects the rear end of the lever 220 with the link 212 having a pin-and-slot connection 222 with the latter. A spring 223 is arranged to draw the link 221 upward and the link 212 downward.

A dog or pawl 224 is pivoted to the key 215 and engages the stud on the lever 219 so that when the key 215 is depressed it will oscillate the lever 219 and the lever 220 and thereby draw down the front end of the link 212. Thereupon when the handle is drawn forward the lever 206 may turn free of the link 212 so that the wheels 191 will remain in mesh with the gear parts 33. The gear parts and type-carriers travel forward until stopped by the teeth 194 on the wheels striking the rear edges of the shoulders 201 which causes the types corresponding to the number represented in the wheels to stop side by side at the printing line. The types are driven to record the number by the hammers 119 in the same way as above described. The number so recorded may be again introduced into the wheels 191 as the parts return to idle position, or the machine may be kept clear, as desired. If the total key be released before the handle starts backward said key will immediately spring upward and draw the levers 219 and 220 to their idle positions. This raises the link 212 and leaves the total wheels without restraint and as the gear parts move backward they operate the wheels and re-introduce the number therein. A latch pawl 225 (Figs. 10 to 13) is pivoted to a support 226 adjacent to the key 215 and a lock pawl 227 is also pivoted to said support, said two pawls being connected by a spring 228. The latch pawl 225 has one or more teeth 229 thereon in position to engage the attenuated edge of the projection 217 when the total key is depressed, and thereby hold said key down. Therefore when it is desired to print the total it is only necessary to depress the total key and the latter will be held down while the parts move to record without manual aid. A link 230 is pivoted at its rear end to the arms 55 on the shaft 42 and guided at its front end by a guide piece 231 having a screw projecting through a slot 232 in the link. A series of teeth 233 are on the edge of the key 215 adjacent to a projection 234 (Fig. 13) on the pawl 227. A lug 235 on the link 230 engages a pin 236 on the pawl 227 when the machine is at rest, but when the handle starts forward to record any item, the link 230 slides forward and the spring 228 at once snaps the lock pawl 227 into engagement with the teeth 233 so that the total key is locked and cannot be depressed while the handle is making a stroke. When the total key is depressed to cause a total to be recorded, it will be held down until the total has been recorded at which time the lug 235 on the sliding link 230 strikes a pin 237 on the latch pawl 225 and thereby releases the total key which is at once drawn up by the spring 216 before the parts start back toward idle position. Such is the operation when the total recorded is again introduced in the machine. If the key should, from any cause, fail to rise the lever 219 will, nevertheless, be released. A block 238 is secured to the link 230 and, when the key is held down by the latch pawl 225, strikes a lug 239 (Fig. 14) on the dog 224 just before completing its forward stroke and releases the said dog 224 from the stud permitting the end of the lever 219 to rise. A small spring 240 actuates the dog 224, and when the key 215 finally rises the spring 240 yields so that the key may be drawn all the way up to engage the dog over the stud again. When the key 215 is held by the latch pawl said key is at a slight elevation sufficient to hold the lug 239 in the path of the block 238, but if the key be pushed entirely down the block will pass over the lug without moving the same.

To clear the machine when recording the total and prevent its re-introduction into the wheels 191, the total key is held entirely down. When the lever 206 oscillates the lower pin 211 thereon becomes seated in the notch 213 on the under side of the link 212, which occurs about the time that the parts reach the end of their forward stroke. When the parts start back the cam 59 rocks the shaft 202, as described in connection with the total mechanism, and the lower end of the lever 206 moves rearward. The link 212 being held down will also be moved rearward thereby oscillating the arms or levers 188 and drawing the total wheels down. This occurs before the gear parts 33 have started to move rearward, so that said parts may move without operating the wheels. In this instance the total key is held down manually until the link 230 retracts the lug 235 from the pin 237 on the latch member 225 and the latch member then engages with the key and holds it down. The lever 219 will also be held depressed in this instance because the lug 239 is below the block 238 when the key is held entirely down. A member 241 is supported by screws or pins projecting through slots 241ᵇ into the plate 27 and is actuated in the direction of the total key by a spring 241ᵃ connected to one of the said screws or pins and to a projection on said member. Said member has a cam-like end 241ᶜ which is under the lever 219, and when said lever is lowered it pushes the member 241 crosswise of the key board. A projection 242 on said member is carried under the left one of numeral key levers 4 when so moved and locks the locking plates or pawls 29 against leftward movement. Obviously none of the key-levers 4 can be operated when said plates are so held, so that no numeral key can be operated when the total key is depressed until after the total has been recorded.

As before stated in connection with the ribbon and ribbon mechanism, the totals may be recorded in a color distinctive from the color of the items records. This is accomplished by use of a bi-chrome ribbon and, as described, utilizing one strand of color—the upper strand in this instance—for the items and the other strand of color for the totals. A link 243 has an angular slot 244 (Fig. 31) in its front end, a portion of said slot being horizontal and a portion thereof extending upward from the front end of the horizontal portion. A pin on a vertical arm 245 rigid with the lever 220 just above its pivot extends into said slot 244 and is normally against the edge of the vertical portion of said slot. The rear end of said link is pivoted to one of two levers 246 mounted on a shaft 247 at the rear of the machine. A rod 248 is carried by the upper ends of said levers 246 and, in idle position of the parts, is against the rear side of the vertical lever 113. It is obvious, therefore, that depression of the total key will swing the arm 245 rearward and thereby move the link 243 rearward. This results in oscillation of the lever 113 swinging the upper end thereof backward from under the pin 112 so that when the operating handle is drawn forward the lever 106 may swing against the projection 114 which places the lower strand of color of the ribbon at the printing line. When the types are driven to record the total they strike this lower strand of color, which is distinctive from the upper strand, and thereby produce a record of the total in color distinctive from the color of the items record. The front end of the link 243 is held down by a spring 249 (Fig. 31) connecting said link and the lever 220. The link 243 extends over the escapement segment 20 and over the escapement bar 22 (Fig. 19). An arm 250 rigid with the shaft 17 rests upon the segment 20 and a projection 251 on the link 243 engages said arm when the link is pushed rearward by depression of the total key. The shaft is thereby locked against rotation. A projection 252 on the link 243 is carried over the escapement bar 22 when the link is pushed rearward by the total key, thereby locking the bar against displacement by the vibration caused by the operation of the recording mechanism.

As described in connection with the description of the operation of the type-carriers to record items there is a stop member 69 pivotally supported by the carriage to hold the gear parts 33 against forward movement except those that are released by leftward movement of said stop with the carriage. Said stop rests upon a plate 254 having two oblique slots 255 (Fig. 19) through which pins 256 on a sliding plate 257 project. Said plate 257 is held backward by a spring 258 and when so positioned the pins are at the lower ends of the slots 255 thereby holding the plate 254 in its upper position, and holding the stop 69 in front of the projections 35 on the gear parts. When the total key is depressed the rod 248 swings forward against the end of the plate 257 and moves said plate forward, drawing down the plate 254 and permitting the stop 69 to drop below the projections 35. Then when the handle is pulled forward the gear parts and type carriers are free to move to record the number in the total wheels. A cam 259 (Fig. 31) is pivoted to the link 243 and is held against an abutment 260 on said link by a spring 261, leaving said cam free to swing forward. A pin 262 is on the lever 153, and, when swung forward to record items, strikes the edge of the cam without moving the link 243. When the total key is depressed the link 243 is held rearward while the lever 153 swings forward. The pin 262 swings the cam 259 forward and ultimately passes beyond the cam which is snapped back against the abutment 260 by the spring 261. As soon as the handle is released and the lever 153 starts back the pin 262 rubs along the edge of the cam and raises the forward end of the link 243 until the pin operating in the slot 244 is in the horizontal part of said slot. Said link is then moved forward by a spring 263 (Fig. 19) connecting said link to some stationary part of the machine. When the link 243 moves forward it permits the stop 69 again to assume its position in front of the projections 35 on the gear parts 33. When the link moves forward, whether in this way or by release of the total key, the lever 113 is again drawn under the lug 112 by a spring 264 connecting said lever with the adjacent frame 3. A link 265 connects the link 221 (Figs. 2 and 31) with a bell-crank lever 266 pivotally supported by one of the frames 3 and connected with the lever 113 by a link 267. When the link 221 rises from either operation described it assists in restoring the lever 113 to position as a stop for the lever 106.

When the total key is held entirely down to clear the machine the pin 211 on the lower end of the lever 206 becomes seated in the notch 213 on the lower edge of the link 212. Said link is, therefore, pushed backward and the total wheels lowered when the handle and recording parts commence their return stroke. The total key then being released from manual restraint becomes engaged by the latch pawl 225 and will still be held down. The link 212, being also held down, will be moved forward by the lever 206 when the handle is drawn forward on the next stroke. This moves the levers or arms 188 forward, thereby raising the wheels 191 into mesh with the racks. There being no number in the wheels 191 they hold the gear parts 33 against forward movement when the handle is drawn forward, as described in connection with recording the total. When the wheels 191 are raised the links or retainers 192 are also raised. The said link or retainer 192 on the right relative to the operator carries a pivoted link 268 (Figs. 36 and 38) the upper end of which is pivoted to the front end of a lever 269 mounted on the shaft 131 alongside of the levers 132. A pin 270 on the rear end of the lever 269 projects over the lever 132 that is in units order and, when the link or retainer 192 is raised as above described, it is obvious that the front end of the lever 132 in units order will be raised, and that the rear end of the bar 126 controlled thereby will also be raised. Then when the handle is drawn forward the type-carriers move to aline the "0" or uppermost types at the printing line, and the units hammer will be released by the bar 133 pushing forward the bar 126. The total key lever 219 being held down by the total key will, through the various connections including the link 265, the lever 266 and link 267 hold the end of the lever 113 out of the way of the lug 112 (Fig. 2) so that as the parts move forward the lever 106 will raise the lower strand of color of the ribbon to the printing line, and the hammer which is released will cause a character to be printed in that color, such color being the same color of the total records and of a color different from the items records. This character is an indication that no number is contained in the total wheels, and that the machine is clear. The parts move back to idle position in same way as previously described.

It is obvious that, if it were possible to depress the total key and record the number represented in the wheels 191 before the gear parts 33 had again moved forward to their idle position after moving rearward to carry or transfer, the correct total would not be printed, since it is necessary that the pins 200 on the gear parts rest against the ends of the hooked portions 198 within the notches 199 before the act of carrying or transferring is complete. To prevent such erroneous operation automatic locking mechanism to prevent depression of the total key at such times is provided. Two angular levers 271 (Figs. 2, 17 and 19) are pivotally supported above the rod 248, having projections extending in front of and behind said rod so that when said rod is moved forward it raises the forward ends of said levers. A rod 272 is supported by the forward ends of said two levers. A lever 273 is pivoted to one of the inner frame parts and a spring 274 actuates the lower end thereof forward. A rod 275 is attached to said lever and projects transversely behind the gear parts 33. When any of the gear parts move backward in the act of carrying or transferring such gear parts push the rod 275 and thereby the lower end of the lever 273 backward, the latter becoming positioned immediately over the rod 272 on the levers 271. Obviously the ends of said levers 271 are thereby locked down, and they in turn through the levers 271, the link 243, and other connections lock the total key so that said key cannot be depressed while the parts are in the position described. By drawing the handle forward to permit the gear parts to return to idle position, the lever 273 is released and swung forward away from the rod 272. The act of carrying or transferring is then complete and the total key may be depressed to cause the total to be recorded.

When a total is being recorded the stop 69 releases all the gear parts and those whose operation is necessary to record move forward, as explained, until stopped by the wheels 191. To prevent the total from being reintroduced into said wheels they are lowered out of mesh with the gear parts while the latter are still forward. When the wheels are lowered in this manner all restraint is removed from the idle gear parts and they would immediately be snapped forward until stopped by the rod 39. This useless operation is avoided by a special lock operated at the right time to restrain the gear parts until the foremost ones start back. Two pivoted arms or levers 276 project forward one at each side of the group of gear parts and carry a rod 277 on their front ends said rod extending transversely under the gear parts. A lever 278 is pivoted to one of the arms 276 and has its rear end held against the rod 272 (Figs. 2 and 19) by a spring 279 so that when said rod is raised by the depression of the total key the rear end of the lever 278 will be raised and the front end lowered. A pin 280 is on the front end of said lever. A cam piece 281 is attached to the arm or lever 188 adjacent to which the lever 278 terminates. When the arms or levers 188 are held forward (Fig. 19) the cam piece 281 is too far away to interfere with the lever 278 but when said levers 188 are pushed rearward to lower the total wheels the cam piece pushes upward the end of the lever which raises the ends of the levers 276. The rod 277 is thereby carried between the teeth on the gear parts 33 and prevents the latter from being drawn forward. The moment the foremost gear part starts backward it pushes the rod 277 downward thereby releasing all the gear parts. The cam piece 281 is carried behind the pin 280 when the levers 188 reach their rearmost position so that there is no resistance to the downward movement of the rod 277.

To facilitate movement of the shaft 190 in the slots 189 a pawl 282 (Fig. 36) is pivoted to one of the track members 8 and projects forward adjacent to one of the arms or levers 188 operating under a pin 283 on said arm or lever. An inverted V-shaped shoulder 284 is on the upper side of said pawl and when the wheels 191 are in mesh with the gear parts the pin 283 rests in front of the said shoulder at the base thereof, and when the wheels are down entirely out of mesh with the gear parts the pin rests against the rear side of the base of said shoulder. A spring 285 connects the front end of the pawl with the shaft 191 so that said shaft cannot stop intermediate of its two positions referred to.

Just after recording any item or total in the manner described, the platen is automatically rotated the distance of a line space. A link 286 (Fig. 2) connects one of the levers 38 with a lever 287 the lower end of which is pivoted to one of the frames 3. The upper end of said lever 287 has a notch 288 in which rests a rod 289 supported by two links 290 suspended from the platen shaft one at each end of the platen. The platen is free to move laterally and when so moved the rod 289 slides in the notch 288. Each link 290 is connected by a connecting link 291 with a lever 292, said levers being pivoted at their lower ends to the platen end plates 95. Said levers 292 are behind the platen shaft and each of said levers has a pawl 293 pivoted to its upper end, said pawls projecting forward and riding upon ratchet wheels 294 attached to the platen shaft 96. When the handle is drawn forward to record any number, or for other purposes, the link 286 oscillates the lever 287 which draws the pawls 293 forward to engage with other teeth on the ratchet wheels 294. Backward movement of the link 286 causes the pawls 293 to be drawn backward and thereby to rotate the platen a distance equal to a predetermined line space.

Any approved ribbon feed mechanism may be utilized in connection with the shafts 98, such devices being of various and well known constructions and arrangements. The specific mechanism for this purpose is not illustrated in detail as it may be varied or altered in many well known ways.

It is obvious that there may be variations in many respects from the arrangement, construction and combinations shown and described without materially departing from the scope and spirit of the invention. I do not restrict myself to exact features, except where the claims specifically recite such exact features, but

What I claim and desire to secure by Letters Patent of the United States is:

1. In an adding machine, the combination with numeral keys, and a total key, of a series of independently movable locking plates pivoted between said numeral keys, a sliding plate, a spring actuating said sliding plate toward said total key, a cam on said sliding plate whereby said sliding plate will be moved when said total key is depressed, and a projection on said sliding plate arranged to prevent said first-named plates from being moved in one direction when said total key is depressed, substantially as specified.

2. In an adding machine, a plate provided with notches, key levers operating in said notches, swinging plates pivoted to said plate between said notches and between said key levers, total recording mechanism, a sliding member supported by said first named plate, a projection on said sliding member, a spring actuating said sliding member to hold said projection disengaged from said swinging plates, and means for actuating said sliding member to engage said projection against one of said swinging plates incidentally to the operation of said total recording mechanism, and thereby lock said key levers, substantially as specified.

3. In an adding machine, the combination with a platen arranged to hold paper, a ribbon having two longitudinal strands of distinctive colors, ribbon guides holding said ribbon, and type-carriers operable to record numbers, in combination with adding mechanism for adding the numbers recorded, means for moving said ribbon guides, a stop limiting movement of said ribbon guides whereby the item numbers will be recorded in one color, a total key operable to cause said adding mechanism and said type-carriers to coöperate to record the totals represented in said adding mechanism, and a connection operated by said key for moving said stop to enable said ribbon guides to position a distinctive color of ribbon at the recording line, and means for operating said ribbon guides for said purpose, substantially as specified.

4. In an adding machine, the combination with a platen arranged to hold paper, type-carriers, and a ribbon, of guides for holding and moving said ribbon, a lever controlling said type-carriers, a bell crank lever engaging said first-named lever, a link connecting one of said ribbon guides and said bell crank lever, mechanism for operating said lever and said type-carriers to record numbers, and a spring for actuating said bell crank lever and thereby said ribbon guides when said first-named lever and said type-carriers are operated, substantially as specified.

5. In an adding machine, a platen arranged to hold paper, a ribbon, guides for holding and moving said ribbon, and type-carriers for recording numbers, in combination with a lever holding said type-carriers in idle position, a bell crank lever engaging said first named lever, a link connecting one of said guides with said bell crank lever, means for operating said lever and said type-carriers to record numbers, a spring for operating said bell crank lever and thereby said ribbon guides to place the ribbon in recording position, and a stop engaged by said bell crank lever to limit movement of said ribbon guides, substantially as specified.

6. In an adding machine, the combination with a platen arranged to hold paper, a ribbon having two strands of distinctive colors, ribbon guides for holding and moving said ribbon, and type-carriers for recording numbers, of a lever for holding said type-carriers in idle position, a bell crank lever engaging said first-named lever, a link connecting one of said ribbon guides with said bell crank lever, means for operating said first-named lever and said type-carriers for recording purpose, a spring for operating said bell crank lever and thereby said ribbon guides, a stop limiting movement of said bell crank lever and said ribbon guides when one color of said ribbon is in recording position during the recording of items, adding mechanism for adding the items recorded, a key for causing said adding mechanism and said type-carriers to coöperate to record totals represented in said adding mechanism, and means controlled by said key for moving said stop so that said ribbon guides will position a distinctive color of said ribbon in recording position, whereby the totals will be recorded in said distinctive color, substantially as specified.

7. The combination with a platen arranged to hold paper, a ribbon having strands of distinctive colors, ribbon guides for holding and moving said ribbon, and type-carriers operable to record numbers, in combination with a lever for actuating said ribbon guides, means actuating and holding said lever to hold the ribbon away from recording position, a spring for moving said lever to place the ribbon in recording position when said type-carriers are operated to record, a stop limiting movement of said lever so that a single color of said ribbon will be placed in recording position during the recording of items, adding mechanism for adding the items recorded, a key for causing said adding mechanism and said type-carriers to coöperate to clear said adding mechanism, connections controlled by said key for moving said stop and causing one of said type-carriers to operate to print a character in a color distinctive from the color in which the items are recorded when the adding mechanism is clear, substantially as specified.

8. In an adding and recording machine, a series of type-carriers, a swinging frame, adding wheels carried by said swinging frame, means for operating the required number of type-carriers to record the totals represented in said adding wheels, a device for restraining the idle type-carriers against movement after the total has been recorded, a lever for operating said device, and an element carried by said swinging frame for operating said lever, substantially as specified.

9. In an adding machine, a carriage, means for moving and setting up numbers in said carriage, mechanism for recording said numbers, a rack, means for operating said rack to restore said carriage to idle position after each number is recorded, a projection on said rack, a lever engaging said projection, a key, a spring upholding and restoring said key to idle position after each operation, a lever engaged by said key, a link connecting said second-named lever with said first-named lever whereby depression of said key will restore said carriage to idle position, a pawl for engaging said key, and means controlled by operation of the recording mechanism for holding said pawl disengaged from said key when said recording mechanism is idle, substantially as specified.

10. In an adding machine, a shaft, a type-carrier pivoted on said shaft, a rack pivoted on said shaft, means for operating said type-carrier, a plate spring attached to said type-carrier and arranged to engage with said rack when said type-carrier is operated, a lug on said rack engaging said spring, and means for limiting movement of said rack and thereby limiting movement of said type-carrier.

11. In a machine of the character described, the combination with a key movable from an idle position to an operative position, of a pivoted latch operable to hold said key in its idle position, a pivoted latch for holding said key in its operative position, a single element for controlling the operation and release of said latches, and means controlled by said element normally holding said first-named latch disengaged from said key, substantially as specified.

12. In a machine of the character described, the combination with a key movable from an idle position to an operative position, of a latch locking said key in idle position under certain conditions, a latch for holding said key in operative position, and a single element for releasing both of said latches, substantially as specified.

13. In an adding machine, the combination with a carriage, rows of pins movably mounted in said carriage, means for setting said pins to represent numbers, means for moving said carriage in one direction during the setting of numbers, means for moving said carriage to idle position, a support, and a series of flexible arms carried by said support and arranged to hold the majority of said pins from movement when said carriage is in idle position only one of said rows of pins being free from said arms, substantially as specified.

14. In an adding machine, a carriage, a series of rows of pins in said carriage, means for setting said pins to represent numbers, means for moving said carriage during the setting of numbers, a support, a series of flexible arms carried by said support and holding all of said pins against operation when said carriage is in its idle position, except the pins in one row, substantially as specified.

15. In an adding machine, a platen arranged to hold paper, mechanism including type operable to record numbers on paper on said platen, adding mechanism operated by said recording mechanism to add the numbers recorded, and a key for causing said adding and recording mechanisms to coöperate to record the totals and to clear the adding mechanism, in combination with means also controlled by said key for causing a single type in said numbers recording mechanism to record a single character in a color distinctive from the color in which the items are recorded while the remaining type remain idle, when the machine is clear, substantially as specified.

16. In an adding machine, a platen arranged to hold paper, a ribbon extending parallel with said platen and provided with strands of different colors, ribbon guides holding said ribbon, mechanism operable to record numbers on paper on said platen with one color of said ribbon, adding mechanism to add the numbers recorded, a key for causing said adding and recording mechanisms to coöperate to record the totals and to clear the adding mechanism, a spring for actuating said ribbon guides to position a distinctive strand of color of said ribbon at the recording line when said totals are recorded as aforesaid, and means controlled by said key for permitting said spring to operate said ribbon guides as aforesaid when the machine is clear, in combination with means for operating a part of said numbers recording mechanism to record a character in said distinctive color when the machine is clear and after operation of said key, substantially as specified.

17. In an adding machine, a platen arranged to hold paper, a ribbon having two longitudinal strands of distinctive colors, ribbon guides holding said ribbon, type-carriers, means for operating said type-carriers and said ribbon guides and thereby said ribbon to record numbers in one of said colors, a stop device limiting movement of said ribbon guides when operated as aforesaid, adding mechanism for adding the numbers recorded, a total key for causing said adding mechanism and said type-carriers to coöperate to record the totals represented in said adding mechanism and to clear said adding mechanism, connections for moving said stop device and permitting said ribbon guides to present a different color of said ribbon at the recording line when the adding mechanism is cleared, and means coöperating with one of said numbers-recording type-carriers to record a character in said different color when the adding mechanism is cleared, substantially as specified.

18. In an adding machine, a carriage, devices coöperatively related whereby numbers may be set up in said carriage and said carriage may be moved from order to order toward higher numerical orders, adding mechanism operable to add the numbers set up in said carriage, clearing mechanism operable to clear said adding mechanism, and means controlled by part of said clearing mechanism to prevent movement of said carriage as aforesaid during clearing operations.

19. In an adding machine, the combination with recording and adding mechanisms, a carriage whose operation is necessary before said mechanisms can be operated in adding operations, and clearing mechanism whereby said adding and recording mechanisms may be operated in clearing operations, of means controlled by said clearing mechanism to prevent operation of said carriage while said clearing mechanism is operating.

20. In an adding machine, the combination with adding mechanism, a laterally movable carriage controlling said adding mechanism, mechanism for clearing said adding mechanism, and means for adjusting said clearing mechanism for operation, of elements controlled by said adjusting means effectively to prevent lateral movement of said carriage while said clearing mechanism is in operation.

21. In an adding machine, the combination with a totalizer and its actuating devices, of a movable carriage containing stops for controlling said actuating devices, digit keys for positioning said stops, a total key, and means whereby when said total key has been operated, said carriage is locked against movement, substantially as specified.

22. In an adding machine, the combination with a totalizer and its actuating devices, of a movable carriage containing stops for controlling the position of said actuating devices, digit keys for positioning said stops, a total key, and means for preventing operation of said total key when said carriage is in other than its home position, substantially as described.

23. In an adding machine, the combination of a total key, differential mechanism, depressible digit keys, each of which is operable to set up one or more digits as may be required in any number including the same digit one or more times, means for returning each digit key to its starting point after each operation thereof and before depression of any other digit key, and means operated as an incident to the operation of any digit key to prevent operation of the total key.

24. In an adding machine, the combination of a total key, differential mechanism, depressible digit keys, each of which is operable to set up one or more digits as may be required in any number including the same digit one or more times, means preventing simultaneous depression of more than one of said digit keys, means for returning each of said digit keys to its starting point before depression of any other digit key as required to enable the digit keys to be successfully operated, an actuator for moving the differential mechanism to and from operative position, and a device controlled by said actuator for preventing operation of said total key when said differential mechanism is in operative position.

25. In an adding machine, the combination with a totalizer and its actuating devices, of stops, digit keys for positioning said stops, a traveling carriage in which said stops are mounted, a total key, and means common to all of the digit keys and said total key whereby when the total key is operated the digit keys cannot be operated, substantially as described.

26. In an adding machine, the combination with a series of type carriers arranged in numerical orders, numerical type carried by each of said type carriers, mechanism for positioning any desired numerical type in position to record, a hammer coöperating with each type carrier for driving said type to record after said type have been positioned as aforesaid, mechanism controlled by said type carriers to add the numbers recorded as aforesaid, means for clearing said adding mechanism, and means for operating the type carrier in units order and the hammer coöperating therewith independently of the remaining hammers to record a character indicating a clear condition of said adding mechanism, substantially as described.

27. The combination with a series of type carriers arranged in numerical orders, a series of hammers also arranged in numerical orders for coöperating with said type carriers to record numbers, adding mechanism controlled by said type-carriers to add the numbers recorded, and mechanism for clearing said adding mechanism, of means adjustable incidentally to the clearing operation to permit coöperation of said hammers and type in recording actions, and means for controlling the hammer and type carrier in units order alone effectively to record a character, indicating a clear condition of the adding mechanism, substantially as described.

28. In an adding machine, the combination with a carriage, mechanism for setting up numbers in said carriage preliminary to adding said numbers, respectively, mechanism for adding the numbers set up in said carriage, and clearing mechanism whereby said adding mechanism may be cleared, of means adjusted by the position of said clearing mechanism to prevent movement of said carriage, substantially as described.

29. In an adding machine, the combination with adding and recording mechanisms, and a carriage whose operation is necessary before said adding and recording mechanism can be operated in adding operations, of means for moving said carriage preliminary to operation of said adding mechanism, means for clearing said adding mechanism, and means controlled by the position of said clearing means to prevent movement of said carriage, substantially as described.

30. In a calculating machine, the combination of bars having shouldered stops, a traveling carriage, stops in said carriage, a spring-pressed plate mounted on said carriage and normally preventing movement of said bars but permitting movement thereof as said bars are successively brought under control of said stops, and means for moving said plate so as to release all of said bars while the carriage is stationary; substantially as described.

31. In a calculating machine, the combination with a stop carriage and its stops, type carriers whose position is controlled by said stops, a hinged plate on said carriage for coöperating with the shoulder stops on said type carriers, and means for moving said plate out of the paths of said shoulder stops; substantially as described.

32. In a calculating machine, the combination with a stop carriage and its stops, type carriers whose position is controlled by said stops, a hinged plate on said carriage for coöperating with the shoulder stops on said type carriers, and a total key for moving said plate out of the paths of said shoulder stops; substantially as described.

33. In a calculating machine, the combination of totalizer wheels and their racks which are normally in engagement, means for successively introducing items into said wheels of a total key for maintaining said engagement after the introduction of the last item, a power shaft, and means operated by the power shaft for disengaging the racks from the total wheels, whereby the totalizer wheels are permitted to return to their home position while standing at zero; substantially as described.

34. In a calculating machine, the combination with totalizer wheels and their racks, which parts are normally engaged, movable supports for said totalizer wheels, a total key for maintaining engagement between said wheels and racks during the initial part of the total-taking operation, a power shaft, means operated by the power shaft for effecting the disengagement of said wheels and said racks, when said racks stand at zero, and means operated by said total key when held depressed to prevent said power shaft from effecting such disengagement, whereby the engagement between the wheels and racks continues and the total is retained in the totalizer wheels; substantially as described.

35. In a calculating machine, the combination of a total key and digit keys, and means whereby when any digit key is operated the total key cannot be operated; substantially as described.

36. In a calculating machine, the combination with a total key and digit keys, of a movable element which is moved in one direction upon the operation of any digit key and in another direction upon the operation of said total key, and means for preventing said element being moved by the total key when any digit key has been operated to position said movable element; substantially as described.

37. In a calculating machine, the combination with a total key and digit keys, of a movable element which is moved in one direction upon the operation of any digit key and in another direction upon the operation of said total key, and means for preventing movement of said element by any digit key when the total key has been operated; substantially as described.

38. In a calculating machine, the combination with a total key and digit keys, of a movable element which is moved in one direction upon the operation of any digit key and in another direction upon the operation of said total key, and means for preventing the movement of said element by either the total key or any digit key when the other key has been operated, substantially as described.

In testimony whereof, I hereunto affix my signature to this specification this 3rd day of October, 1906, in the presence of two witnesses.

SAMUEL GERRY DORMAN. [L. S.]

Witnesses:
JAMES L. DALTON,
NETTIE WINSTON.